US012374288B2

(12) United States Patent
Noh et al.

(10) Patent No.: US 12,374,288 B2
(45) Date of Patent: Jul. 29, 2025

(54) PIXEL CIRCUIT AND DISPLAY APPARATUS COMPRISING PIXEL CIRCUIT

(71) Applicant: LG Display Co., Ltd., Seoul (KR)

(72) Inventors: Junhwan Noh, Seoul (KR); DongSup Sim, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/512,576

(22) Filed: Nov. 17, 2023

(65) Prior Publication Data

US 2024/0194139 A1 Jun. 13, 2024

(30) Foreign Application Priority Data

Dec. 12, 2022 (KR) ........................ 10-2022-0173112

(51) Int. Cl.

| | |
|---|---|
| ***G09G 3/3233*** | (2016.01) |
| ***G09G 3/3258*** | (2016.01) |
| ***G09G 3/3266*** | (2016.01) |
| ***G09G 3/3275*** | (2016.01) |
| *G09G 3/3208* | (2016.01) |

(52) U.S. Cl.

CPC ......... *G09G 3/3233* (2013.01); *G09G 3/3258* (2013.01); *G09G 3/3266* (2013.01); *G09G 3/3275* (2013.01); *G09G 3/3208* (2013.01); *G09G 2310/0243* (2013.01); *G09G 2310/0278* (2013.01); *G09G 2310/08* (2013.01); *G09G 2320/0233* (2013.01); *G09G 2320/0247* (2013.01)

(58) Field of Classification Search

CPC .. G09G 3/3233; G09G 3/3266; G09G 3/3275; G09G 3/3208; G09G 3/3258; G09G 2310/0278; G09G 2310/08; G09G 2310/0243; G09G 2320/0247; G09G 2320/0233

USPC .......................................................... 345/204

See application file for complete search history.

(56) References Cited

U.S. PATENT DOCUMENTS

| | | | | |
|---|---|---|---|---|
| 2010/0245219 A1* | 9/2010 | Shishido | G09G 3/3241 | 345/80 |
| 2022/0084472 A1* | 3/2022 | Kim | G09G 3/3266 | |
| 2022/0302242 A1* | 9/2022 | Dai | H10K 59/131 | |
| 2022/0319418 A1* | 10/2022 | Yu | G09G 3/3233 | |
| 2023/0263020 A1* | 8/2023 | Yu | G09G 3/3233 | |
| 2023/0316999 A1* | 10/2023 | Zhou | H10K 59/131 | 345/214 |
| 2024/0029656 A1* | 1/2024 | Lee | G09G 3/3258 | |

(Continued)

*Primary Examiner* — Tom V Sheng

(74) *Attorney, Agent, or Firm* — Fenwick & West LLP

(57) ABSTRACT

The present disclosure relates to a pixel circuit and a display apparatus comprising the pixel circuit. A pixel circuit according to an exemplary embodiment of the present disclosure may include a driving transistor including a gate electrode, a first electrode, and a second electrode, a first transistor connected to the gate electrode and the second electrode, a second transistor connected to the first transistor and the gate electrode, a third transistor connected to the second electrode and the first transistor, a first capacitor connected to the gate electrode, the first transistor, the second transistor, and a high potential power line, a second capacitor connected to the high potential power line, the first capacitor, and the second transistor, and a light emitting diode connected to the third transistor and the low potential power line.

13 Claims, 11 Drawing Sheets

(56) References Cited

U.S. PATENT DOCUMENTS

| | | | | |
|---|---|---|---|---|
| 2024/0177657 | A1* | 5/2024 | Wang | G09G 3/3233 |
| 2024/0258327 | A1* | 8/2024 | Liu | H01L 25/167 |
| 2024/0265876 | A1* | 8/2024 | Hou | G09G 3/3266 |
| 2024/0268147 | A1* | 8/2024 | Zhang | H10K 59/353 |
| 2024/0268165 | A1* | 8/2024 | Yu | H10K 59/123 |
| 2024/0274072 | A1* | 8/2024 | Li | G09G 3/3233 |

* cited by examiner

PIXEL CIRCUIT AND DISPLAY APPARATUS COMPRISING PIXEL CIRCUIT

CROSS-REFERENCE TO RELATED APPLICATION

This application claims the priority of Republic of Korea Patent Application No. 10-2022-0173112 filed on Dec. 12, 2022, in the Korean Intellectual Property Office, which is incorporated by reference in its entirety.

BACKGROUND

Field

The present disclosure relates to a pixel circuit and a display apparatus including a pixel circuit.

Description of the Related Art

An organic light emitting diode (OLED) which is a self-emitting device includes an anode electrode, a cathode electrode, and an organic compound layer formed therebetween. The organic compound layer is formed of a hole transport layer (HTL), an emission layer (EML), and an electron transport layer (ETL). When a driving voltage is input to the anode electrode and the cathode electrode, holes which pass through the hole transport layer HTL and electrons which pass through the electron transport layer ETL move to the emission layer EML to form excitons so that the emission layer EML generates visible rays. An organic light emitting display apparatus includes an organic light emitting diode (OLED) which is a self-emitting device and is used in various ways with the advantages of a fast response speed, large luminous efficiency, luminance, and viewing angle.

The organic light emitting display apparatus includes an organic light emitting diode and adjusts a luminance of the pixels disposed in a matrix in accordance with a gray scale level of video data. Each pixel includes an organic light emitting diode, a driving transistor which controls a driving current flowing through the organic light emitting diode in accordance with a voltage between the gate and the source and at least one switching transistor which programs the voltage between the gate and the source of the driving transistor.

In some cases, in some pixel circuit, a coupling phenomenon is generated between some nodes included in the pixel circuit to cause flicker. The flicker refers to blinking of the panel so that in order to improve the quality of the organic light emitting display apparatus, the flicker needs to be improved.

SUMMARY

An object to be achieved by the exemplary embodiment of the present disclosure is to provide a pixel circuit which uses a capacitor and a transistor which compensate for a luminance variation to reduce the flicker to improve a display quality and a display apparatus including the same.

Objects of the present disclosure are not limited to the above-mentioned objects, and other objects, which are not mentioned above, can be clearly understood by those skilled in the art from the following descriptions.

A pixel circuit according to an aspect of the present disclosure includes a driving transistor including a gate electrode, a first electrode, and a second electrode, a first transistor connected to the gate electrode and the second electrode, a second transistor connected to the first transistor and the gate electrode, a third transistor connected to the second electrode and the first transistor, a first capacitor connected to the gate electrode, the first transistor, the second transistor, and a high potential power line, a second capacitor connected to the high potential power line, the first capacitor, and the second transistor and a light emitting diode connected to the third transistor and a low potential power line.

A pixel circuit according to another aspect of the present disclosure includes a driving transistor which includes a gate electrode, a first electrode, and a second electrode, the first electrode being connected to a first node, the gate electrode being connected to a second node, and the second electrode being connected to a third node, a first transistor connected between the second node and the third node, a second transistor connected to the second node, a first capacitor connected between the second node and a high potential power line, a second capacitor connected between the high potential power line and the second transistor, a third transistor connected between the third node and a fourth node and a light emitting diode connected between the fourth node and a low potential power line.

Display apparatus according to an aspect of the present disclosure includes a display panel including the pixel circuit, a gate driving circuit connected to the pixel circuit and a data driving circuit connected to the pixel circuit.

Other detailed matters of the exemplary embodiments are included in the detailed description and the drawings.

According to the present disclosure, the pixel circuit and the display apparatus use the capacitor and the transistor which compensate for the luminance variation to reduce the flicker, thereby improving a display quality.

The effects according to the present disclosure are not limited to the contents exemplified above, and more various effects are included in the present specification.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION

Figure 1:
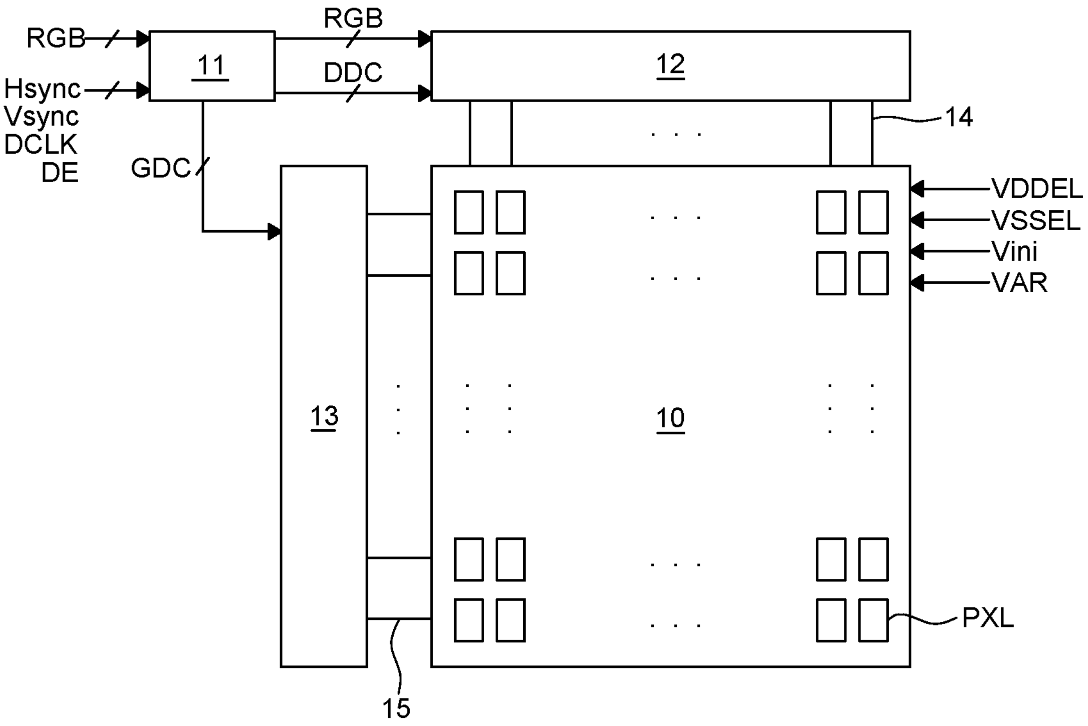
FIG. 1 is a block diagram of a display apparatus according to an exemplary embodiment of the present disclosure.

The terms used in the embodiments of this specification have been selected from general terms that are currently widely used as much as possible while considering the functions in the present disclosure, but they may vary depending on the intention or precedent of a person skilled in the art, the emergence of new technologies, and the like. there is. In a specific case, there is a term arbitrarily selected by the applicant, and in this case, the meaning will be described in detail in the corresponding description. Therefore, the term used in this specification should be defined based on the meaning of the term and the overall content of the present disclosure, not simply the name of the term.

When it is said that a certain part "includes" a certain component throughout the specification, it means that it may further include other components, not excluding other components unless otherwise state.

Expressions of "at least one of a, b, and c" described throughout the specification include 'a alone', 'b alone', 'c alone', 'a and b', 'a and c', 'b and c'', or 'all a, b, and c'. Advantages and features of the present invention, and methods of achieving them, will become clear with reference to the embodiments described below in detail in conjunction with the accompanying drawings.

The shapes, sizes, ratios, angles, numbers, and the like illustrated in the accompanying drawings for describing the exemplary embodiments of the present disclosure are merely examples, and the present disclosure is not limited thereto. Further, in the following description of the present disclosure, a detailed explanation of known related technologies may be omitted to avoid unnecessarily obscuring the subject matter of the present disclosure.

The terms such as "including," "having," and "comprising" used herein are generally intended to allow other components to be added unless the terms are used with the term "only". Any references to singular may include plural unless expressly stated otherwise.

When the position relation between two parts is described using the terms such as "on", "above", "below", and "next", one or more parts may be positioned between the two parts unless the terms are used with the term "immediately" or "directly".

Although the terms "first", "second", and the like are used for describing various components, these components are not confined by these terms. These terms are merely used for distinguishing one component from the other components. Therefore, a first component to be mentioned below may be a second component in a technical concept of the present disclosure.

The features of various embodiments of the present disclosure can be partially or entirely adhered to or combined with each other and can be interlocked and operated in technically various ways, and the embodiments can be carried out independently of or in association with each other.

In addition, the terms that will be described later are defined in consideration of the functions in the implementation of this specification, which may change depending on the intention of the user, operator, or custom. Therefore, the definition should be made based on the contents throughout the specification.

The following exemplary embodiments will be described with respect to an organic light emitting apparatus. However, exemplary embodiments of the present disclosure are not limited to an organic light emitting display apparatus, but may be applied to various electroluminescent display apparatuses. For example, the electroluminescent display apparatus may use an organic light emitting diode (OLED) display apparatus, a quantum dot light emitting diode display apparatus, or an inorganic light emitting diode display apparatus.

Hereinafter, exemplary embodiments of the present disclosure will be described with reference to the drawings.

FIG. 1 is a block diagram of a display apparatus according to an exemplary embodiment of the present disclosure.

Referring to FIG. 1, the display apparatus according to an exemplary embodiment may include a display panel 10 in which a sub pixel PXL for internal compensation is disposed, a data driver (data driving circuit) 12 which drives data lines 14, a gate driver (gate driving circuit) 13 which drives gate lines 15, a timing controller (or T-con) 11. The timing controller 11 controls driving timings of the data driving circuit 12 and the gate driving circuit 13. For example, the gate driving circuit 13 may be a first driving circuit, but is not limited by the term. For example, the data driving circuit 12 may be a second driving circuit, but is not limited by the term.

In the display panel 10, a plurality of data lines 14 and a plurality of gate lines 15 intersect and a plurality of sub pixels PXL for internal compensation may be disposed in the intersecting area of the data lines 14 and/or the gate lines 15. The sub pixel PXL may be disposed in a matrix as illustrated in the drawing, but is not limited thereto. Sub pixels PXL disposed in the same pixel row is connected to the plurality of gate lines 15 and the plurality of gate lines 15 may include at least one or more scan line and at least one or more emission signal lines.

For example, each sub pixel PXL may be connected to one data line 14 and at least one or more of the scan line and the emission control line. The sub pixels PXL may be commonly supplied with a high potential voltage VDDEL, a low potential voltage VSSEL, an initialization voltage Vini, and a reset voltage VAR, from a power generator. Each of the high potential voltage VDDEL, the low potential voltage VSSEL, the initialization voltage Vini, and the reset voltage VAR may have a predetermined voltage value. The high potential voltage VDDEL may have a higher voltage value than the low potential voltage VSSEL.

Thin film transistors (TFTs) which configure the sub pixel PXL may be implemented as oxide transistors (or oxide TFTs) including an oxide semiconductor layer. The oxide TFT may be advantageous in increasing a size of the display panel 10 in consideration of the electron mobility and the process deviation. However, the exemplary embodiments of the present disclosure are not limited thereto and the semiconductor layer of the TFT may be formed by an amorphous silicon TFT (a-Si TFT) or a low temperature polysilicon (LTPS) TFT.

Each sub pixel PXL may include a plurality of TFTs and a plurality of capacitors to compensate for a deviation of a threshold voltage Vth of the driving TFT. A specific configuration of each sub pixel PXL will be described in detail below.

In FIG. 1, a basic pixel may be configured by at least three sub pixels of white (W), red (R), green (G), and blue (B) sub pixels. For example, the basic pixel may be configured by sub pixels of a combination of red (R), green (G), and blue (B), sub pixels of a combination of white (W), red (R), and green (G), sub pixels of a combination of blue (B), white (W), and red (R), or sub pixels of a combination of green (G), blue (B), and white (W). Further, the basic pixel may be configured by sub pixels of a combination of white (W), red (R), green (G), and blue (B), but the exemplary embodiment of the present disclosure is not limited thereto.

The timing controller 11 redisposes digital video data RGB input from the outside in accordance with a resolution of the display panel 10 to supply the digital video data to the data driver 12. Further, the timing controller 11 may generate a data control signal DDC for controlling an operation timing of the data driving circuit 12 and a gate control signal GDC for controlling an operation timing of the gate driving circuit 13, based on timing signals such as a vertical synchronization signal Vsync, a horizontal synchronization signal Hsync, a dot clock signal DCLK, and a data enable signal DE.

The data driving circuit 12 converts digital video data RGB input from the timing controller 11 into an analog data voltage based on the data control signal DDC, for example, converts the digital video data into a data voltage Vdata of FIG. 3 to be described below to supply the converted data voltage to a plurality of data lines 14.

The gate driving circuit 13 may generate a scan signal and an emission signal based on the gate control signal GDC. The scan signal may include a first scan signal SC1 to fourth scan signal SC4 of FIG. 3 to be described below as an example. The emission signal may include an emission signal EM of FIG. 3 to be described below as an example.

In the exemplary embodiment, the gate driving circuit 13 may include a scan driver and an emission signal driver. The scan driver generates a scan signal in a row sequential manner to drive at least one scan line connected to each pixel row to supply the scan signal to the scan lines. The emission signal driver generates an emission signal in a row sequential manner to drive at least one emission signal line connected to each pixel row to supply the emission signal to the emission signal lines.

According to an exemplary embodiment, the gate driver 13 is embedded in the non-active area of the display panel 10 by a gate-driver in panel (GIP) manner, but is not limited thereto. In some cases, a plurality of gate driving circuits 13 may be included and may be disposed on at least two side surfaces of the display panel 10. However, it is not limited thereto and the gate driving circuit 13 may be disposed in the display panel 10 in various placement manners.

Figure 2:
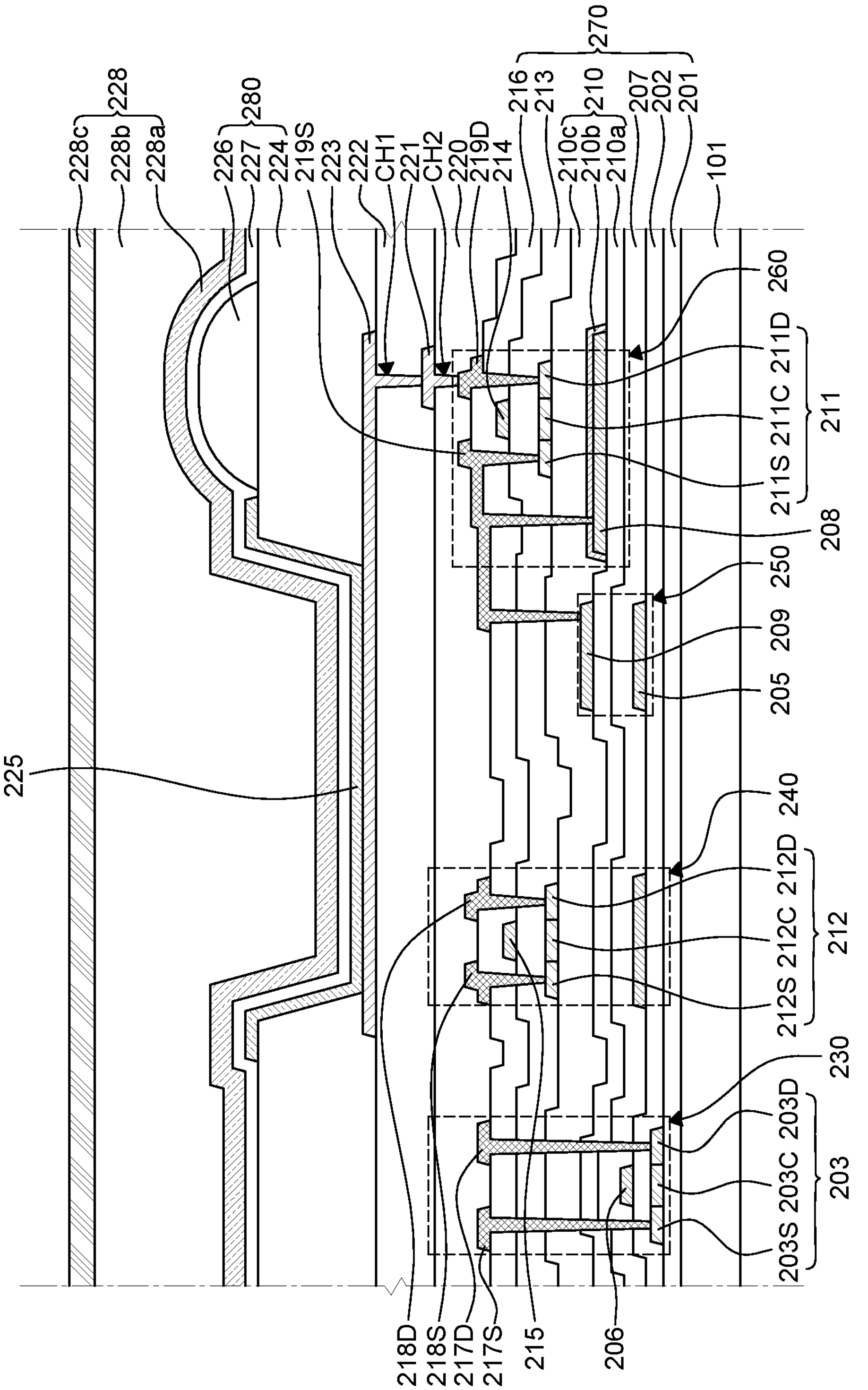
FIG. 2 is a view illustrating a cross-section of at least a part of a display apparatus according to an exemplary embodiment of the present disclosure.

FIG. 2 is a view illustrating a cross-section of at least a part of a display apparatus according to an exemplary embodiment of the present disclosure. FIG. 2 is a cross-sectional view of one driving transistor 260, two switching transistors 230 and 240, and one storage capacitor 250.

With respect to one sub pixel PXL, as illustrated in FIG. 2, the sub pixel PXL includes a driving element unit 270 and a light emitting diode unit 280 which is electrically connected to the driving element unit 270 on the substrate 101. The driving element unit 270 and the light emitting diode unit 280 are insulated by the planarization layers 220 and 222.

The driving element unit 270 may be an array unit including the driving transistor 260, the switching transistors 230 and 240, and the storage capacitor 250 to drive one sub pixel PXL. The light emitting diode unit 280 may be an array unit for emission including an anode electrode 223, a cathode electrode 227, and an emission layer 225 disposed between the anode electrode 223 and the cathode electrode 227. According to the exemplary embodiment, the driving element unit 270 may be a first array and the light emitting diode unit may be a second array, but the exemplary embodiments of the present disclosure are not limited thereto.

In FIG. 2, as an example of the driving element unit 270, one driving transistor 260, two switching transistors 230 and 240, and one storage capacitor 250 are illustrated, it is not limited thereto.

According to the exemplary embodiment, the driving transistor 260 and at least one of the switching transistors use the oxide semiconductor layer as an active layer. The oxide semiconductor layer is a layer configured by an oxide semiconductor material and has an excellent leakage current blocking effect and has a manufacturing cost cheaper than the transistor relatively using the polycrystalline semiconductor layer. For example, the oxide semiconductor layer may include IGZO, ZnO, SnO2, Cu2O, NiO, ITZO, and/or IAZO, but the exemplary embodiments of the present disclosure are not limited thereto. According to the exemplary embodiment of the present disclosure, in order to reduce power consumption and lower a manufacturing cost, the driving transistor 260 and at least one switching transistor may be implemented using the oxide semiconductor layer.

A transistor using a polycrystalline semiconductor layer, including a polycrystalline semiconductor material, for example, polycrystalline silicon (poly-Si) has a fast operation speed and an excellent reliability. Based on the advantage of the polycrystalline semiconductor layer, FIG. 2 illustrates an example that one of the switching transistors is manufactured using the polycrystalline semiconductor layer. The other transistor may be configured as a transistor including an oxide semiconductor layer. However, it is not limited to the exemplary embodiment illustrated in FIG. 2.

In the exemplary embodiment, at least one of the one driving transistor 260 and the two switching transistors 230 and 240 is implemented as a p-type transistor and at least the other may be implemented as an n-type transistor. For example, the driving transistor 260 is a p-type and a transistor including an oxide semiconductor layer, between two switching transistors 230 and 240 may be an n-type, but the exemplary embodiments of the present disclosure are not limited thereto.

In the exemplary embodiment, the substrate 101 may be configured as a multi-layer in which at least one organic layer and at least one inorganic layer are alternately laminated. For example, the substrate 101 may be formed by alternately laminating organic films such as polyimide and inorganic films such as silicon oxide, but the exemplary embodiments of the present disclosure are not limited thereto.

Referring to FIG. 2, a lower buffer layer 201 may be disposed on the substrate 101. The lower buffer layer 201 may block a material permeable from the outside, for example, moisture. The lower buffer layer 201 may use a plurality of laminated oxide silicon (SiOx) films. According to an exemplary embodiment, a second buffer layer may be further formed on the lower buffer layer 201 to be protected from the moisture permeation.

The first switching transistor 230 may be formed on the substrate 101. The first switching transistor 230 may use the polycrystalline semiconductor layer as an active layer. The first switching transistor 230 may include a first active layer 203 including a channel through which electrons or holes move. The first switching transistor 230 may include a first gate electrode 206, a first source electrode 217S, and a first drain electrode 217D.

In the exemplary embodiment, the first active layer 203 may be configured by a polycrystalline semiconductor material. The first active layer 203 may include a first channel region 203C in the middle and includes a first source region 203S and a first drain region 203D with the first channel region 203C therebetween.

In the exemplary embodiment, the first source region 203S and the first drain region 203D may include a region in which an intrinsic polycrystalline semiconductor pattern is doped with group 5 or group 3 impurity ions, for example, phosphorus (P) or boron (B) at a predetermined concentration to be conductive. The first channel region 203C may provide a path through which electrons and holes move by maintaining the intrinsic state of the polycrystalline semiconductor material.

In the exemplary embodiment, the first switching transistor 230 may include a first gate electrode 206 which overlaps the first channel region 203C of the first active layer 203. The first gate insulating layer 202 may be disposed between the first gate electrode 206 and the first active layer 203.

In the exemplary embodiment, the first switching transistor 230 may be implemented by a top gate type in which the first gate electrode 206 is located above the first active layer 203, but the exemplary embodiments of the present disclosure are not limited thereto. In this case, the first capacitor electrode 205 configured by a first gate electrode material and a second light shielding layer 204 of a second switching transistor 240 may be formed by one mask process. In this case, the number of mask processes may be reduced.

In the exemplary embodiment, the first gate electrode 206 may be configured by a metal material. For example, the first gate electrode 206 may be formed of a single layer or a plurality of layers formed of any one of molybdenum (Mo), aluminum (Al), chrome (Cr), gold (Au), titanium (Ti), nickel (Ni), neodymium (Nd), and copper (Cu) or an alloy thereof, but is not limited thereto.

In the exemplary embodiment, the first interlayer insulating layer 207 may be deposited on the first gate electrode 206. The first interlayer insulating layer 207 may be configured by silicon nitride (SiNx). The first interlayer insulating layer 207 configured by silicon nitride (SiNx) may include hydrogen particles. The hydrogen particles which are included in the first interlayer insulating layer 207 permeate the first source region 203S and the first drain region 203D while performing a thermal processing process after forming the first active layer 203 and depositing the first interlayer insulating layer 207 on the first active layer 203. Therefore, the hydrogen particles may contribute to improving and stabilizing a conductivity of a polycrystalline semiconductor material. This is referred to as a hydrogenation process.

In the exemplary embodiment, the first switching transistor 230 may sequentially further include an upper buffer layer 210, a second gate insulating layer 213, and a second interlayer insulating layer 216 on the first interlayer insulating layer 207. The first switching transistor 230 is formed on the second interlayer insulating layer 216 and may include a first source electrode 217S and a first drain electrode 217D connected to the first source region 203S and the first drain region 203D, respectively.

In the exemplary embodiment, the upper buffer layer 210 may make a space between the first active layer 203 configured by the polycrystalline semiconductor material and the second active layer 212 of the second switching transistor 240 and the third active layer 211 of the driving transistor 260 which are configured by oxide semiconductor layers. The upper buffer layer 210 may provide a base for forming the second active layer 212 and the third active layer 211.

In the exemplary embodiment, the second interlayer insulating layer 216 may include an interlayer insulating layer which covers the second gate electrode 215 of the second switching transistor 240 and the third gate electrode 214 of the driving transistor 260. The second interlayer insulating layer 216 is formed on the second active layer 212 and the third active layer 211 configured by the oxide semiconductor material to be formed as an inorganic film which does not include hydrogen particles.

In the exemplary embodiment, the first source electrode 217S and the first drain electrode 217D may be formed of a single layer or a plurality of layers formed of any one of molybdenum (Mo), aluminum (Al), chrome (Cr), gold (Au), titanium (Ti), nickel (Ni), neodymium (Nd), and copper (Cu) or an alloy thereof, but is not limited thereto.

In the exemplary embodiment, the second switching transistor 240 may include a second active layer 212 which is formed on the upper buffer layer 210 and is configured by the second oxide semiconductor layer, a second gate insulating layer 213 which covers the second active layer 212. Further, the second switching transistor 240 may include a second gate electrode 215 formed on the second gate insulating layer 213, a second interlayer insulating layer 216 which covers the second gate electrode 215, and a second source electrode 218S and a second drain electrode 218D which are formed on the second interlayer insulating layer 216.

According to the exemplary embodiment, the second switching transistor 240 is located below the upper buffer layer 210 and may further include a second light shielding layer 204 overlapping the second active layer 212. Here, the second light shielding layer 204 is configured by the same material as the first gate electrode 206 and may be formed on the first gate insulating layer 202.

According to the exemplary embodiment, the second light shielding layer 204 is electrically connected to the second gate electrode 215 to configure a dual gate. When the second switching transistor 240 has a dual gate structure, the flow of current flowing through the second channel region 212C may be more precisely controlled and the display apparatus may be manufactured to be smaller so that a display apparatus having a high resolution may be implemented.

In the exemplary embodiment, the second active layer 212 may include an intrinsic second channel region 212C which is configured by an oxide semiconductor material and is not doped with impurities and a second source region 212S and a second drain region 212D which are doped with impurities to be conductive.

In the exemplary embodiment, the second source electrode 218S and the second drain electrode 218D may be formed of a single layer or a plurality of layers formed of any one of molybdenum (Mo), aluminum (Al), chrome (Cr), gold (Au), titanium (Ti), nickel (Ni), neodymium (Nd), or copper (Cu) or an alloy thereof, like the first source electrode

217S and the first drain electrode 217D. However, the exemplary embodiments of the present disclosure are not limited thereto.

In the exemplary embodiment, the second source electrode 218S and the second drain electrode 218D and the first source electrode 217S and the first drain electrode 217D may be simultaneously formed on the second interlayer insulating layer 216 with the same material. In this case, the number of mask processes may be reduced.

In the exemplary embodiment, the driving transistor 260 may be formed on the upper buffer layer 210. The driving transistor 260 may include the third active layer 211 configured by the first oxide semiconductor layer. Here, the first oxide semiconductor layer and the third active layer 211 are substantially the same so that the same reference numeral will be used to be described.

Referring to FIG. 2, the driving transistor 260 may include a third active layer 211 configured on the upper buffer layer 210 by the first oxide semiconductor layer, a second gate insulating layer 213 which covers the third active layer 211, a third gate electrode 214 formed on the second gate insulating layer 213 and overlaps the third active layer 211, a second interlayer insulating layer 216 which covers the third gate electrode 214, and a third source electrode 219S and a third drain electrode 219D which are disposed on the second interlayer insulating layer 216.

According to the exemplary embodiment, the driving transistor 260 may further include a first light shielding layer 208 which is disposed in the upper buffer layer 210 and overlaps the third active layer 211. The first light shielding layer 208 may be implemented to be inserted (or accommodated) into the upper buffer layer 210.

A shape that the first light shielding layer 208 is disposed in the upper buffer layer 210 will be described by reflecting a process characteristic. The first light shielding layer 208 may be formed on a first upper sub buffer layer 210*a* disposed on the first interlayer insulating layer 207. A second upper sub buffer layer 210*b* fully covers the first light shielding layer 208 from the upper portion and a third upper sub buffer layer 210*c* is formed on the second upper sub buffer layer 210*b*. For example, the upper buffer layer 210 has a structure in which the first upper sub buffer layer 210*a*, the second upper sub buffer layer 210*b*, and the third upper sub buffer layer 210*c* are sequentially laminated.

In the exemplary embodiment, the first upper sub buffer layer 210*a* and the third upper sub buffer layer 210*c* are configured by silicon oxide (SiOx). The first upper sub buffer layer 210*a* and the third upper sub buffer layer 210*c* are configured by silicon oxide (SiOx) which does not include hydrogen particles so as to contribute as a base of the second switching transistor 240 and the driving transistor 260 which use the oxide semiconductor layer as an active layer whose reliability may be degraded by hydrogen particles.

The second upper sub buffer layer 210*b* may be configured by silicon nitride (SiNx) having an excellent ability to collect hydrogen particles. The second upper sub buffer layer 210*b* may be formed to enclose all a top surface and side surfaces of the first light shielding layer 208 to completely seal the first light shielding layer 208.

Hydrogen particles generated during the hydrogenation process of the first switching transistor 230 using the polycrystalline semiconductor layer as an active layer pass through the upper buffer layer 210 to damage the reliability of the oxide semiconductor layer located on the upper buffer layer 210. For example, when the hydrogen particles permeate the semiconductor layer, there may be problems in that the transistor including the oxide semiconductor layer may have different threshold voltages depending on a location where the oxide semiconductor layer is formed or a conductivity of the channel may vary.

However, silicon nitride SiNx included in the upper buffer layer 210 has an excellent ability to collect hydrogen particles as compared with silicon oxide SiOx so that the damage of the reliability of the driving transistor 260 occurred when the hydrogen particles permeate the oxide semiconductor layer may be suppressed.

In the exemplary embodiment, the first light shielding layer 208 may be configured by a metal layer including a titanium (Ti) material having excellent ability to collect hydrogen particles. For example, the first light shielding layer 208 may include a titanium single layer or a double layer of molybdenum (Mo) and titanium (Ti), or an alloy of molybdenum (Mo) and titanium (Ti). However, it is not limited thereto, and another metal layer including titanium (Ti) is also available.

Here, titanium (Ti) captures hydrogen particles diffusing into the upper buffer layer 210 and may suppress the hydrogen particles from reaching the first oxide semiconductor layer 211. In this case, the first light shielding layer 208 of the driving transistor 260 is configured by a metal layer, such as titanium having an ability to collect hydrogen particles. Further, the first light shielding layer 208 is enclosed by a silicon nitride SiNx layer having an ability to collect hydrogen particles so that the reliability of the oxide semiconductor pattern by suppressing the hydrogen particles from reaching the first oxide semiconductor pattern 211 may be ensured.

In the exemplary embodiment, the second upper sub buffer layer 210*b* including silicon nitride (SiNx) is not deposited on the entire surface of the active area, like the first upper sub buffer layer 210*a*. But, the second upper sub buffer layer 210*b* including silicon nitride (SiNx) may be deposited on a part of the top surface of the first upper sub buffer layer 210*a* to selectively cover the first light shielding layer 208. The second upper sub buffer layer 210*b* is formed of a material different from that of the first upper sub buffer layer 210*a*, for example, the silicon nitride (SiNx) film. Therefore, when the second sub buffer layer is deposited on the entire surface of the active area, film lifting may occur. In order to compensate for this, the second upper sub buffer layer 210*b* may be selectively formed in a location where the first light shielding layer 208 is formed, which is required for the function.

In the exemplary embodiment, the first light shielding layer 208 and the second upper sub buffer layer 210*b* may be formed vertically below the first oxide semiconductor layer 211 to overlap the first oxide semiconductor layer 211 by its function. The first light shielding layer 208 and the second upper sub buffer layer 210*b* may be formed to be larger than the first oxide semiconductor layer 211 to fully overlap the first oxide semiconductor layer 211.

In the exemplary embodiment, the third source electrode 219S of the driving transistor 260 may be electrically connected to the first light shielding layer 208.

In the exemplary embodiment, the storage capacitor 250 stores a data voltage which is applied through the data line for a predetermined period and then supplies the data voltage to the light emitting diode. The storage capacitor 250 may include two corresponding electrodes and a dielectric material disposed therebetween. The storage capacitor 250 may include a first capacitor electrode 205 disposed on the same layer as the first gate electrode 206 with the same material and a second capacitor electrode 209 disposed on the same layer as the first light shielding layer 208 with the same material. The first interlayer insulating layer 207 and the first upper sub buffer layer 210*a* may be located between the first capacitor electrode 205 and the second capacitor electrode 209. The second capacitor electrode 209 of the storage capacitor 250 may be electrically connected to the third source electrode 219S.

In FIG. 2, an example that the storage capacitor 250 is formed at one side to be separated from the driving transistor 260 is shown. However, it is not limited thereto and depending on the exemplary embodiment, the storage capacitor 250 may be formed to be laminated on the driving transistor 260. In this case, at least a part of the third source electrode 219S connected to the second capacitor electrode 209 may be omitted. For example, a fourth gate electrode may be further formed on the third gate electrode 214 of the driving transistor 260. At this time, the third gate electrode 214 and the fourth gate electrode may be spaced apart from each other with a predetermined interval and a capacitor may be formed based thereon.

In the exemplary embodiment, a first planarization layer 220 and a second planarization layer 222 which planarize an upper end of the driving element unit 270 may be disposed on the driving element unit 270. The first planarization layer 220 and the second planarization layer 222 may be configured by an organic film, such as polyimide or acryl resin, but the present disclosure is not limited thereto.

The light emitting diode unit 280 is formed on the second planarization layer 222. The light emitting diode unit 280 includes a first electrode 223 as an anode electrode, a second electrode 227 which is a cathode electrode corresponding to the first electrode 223, and an emission layer 225 interposed between the first electrode 223 and the second electrode 227. The first electrode 223 may be formed in each sub pixel.

In the exemplary embodiment, the light emitting diode unit 280 may be connected to a driving element unit 270 through a connection electrode 221 formed on the first planarization layer 220. For example, the first electrode 223 of the light emitting diode unit 280 and the third drain electrode 219D of the driving transistor 260 which configures the driving element unit 270 may be connected by the connection electrode 221.

In the exemplary embodiment, the first electrode 223 may be connected to the connection electrode 221 exposed through a contact hole CH1 which passes through the second planarization layer 222. Further, the connection electrode 221 may be connected to the third drain electrode 219D exposed by the contact hole CH2 which passes through the first planarization layer 220.

The first electrode 223 may be formed to have a multilayered structure including a transparent conductive film and an opaque conductive film having a high reflection efficiency. The transparent conductive film is formed of a material having a relatively high work function, such as indium-tin-oxide (ITO) or indium-zinc-oxide (IZO) and the opaque conductive film is formed with a single or multilayered structure including Al, Ag, Cu, Pb, Mo, Ti, or an alloy thereof. However, the exemplary embodiments of the present disclosure are not limited thereto. For example, the first electrode 223 may be formed with a structure in which a transparent conductive film, an opaque conductive film, and a transparent conductive film are sequentially laminated or a structure in which a transparent conductive film and an opaque conductive film are sequentially laminated. However, the exemplary embodiments of the present disclosure are not limited thereto.

In the exemplary embodiment, the emission layer 225 may be formed by laminating a hole related layer, an organic emission layer, and an electron related layer on the first electrode 223 in this order or in a reverse order. The bank layer 224 may expose the first electrode 223 of each sub pixel and may be a pixel definition film. According to the exemplary embodiment, the bank layer 224 may be formed of an opaque material, for example, black, to suppress the light interference between adjacent sub pixels. In this case, the bank layer 224 may include a light shielding material which is formed of any one of a color pigment, organic black, and carbon, but the exemplary embodiments of the present disclosure are not limited thereto. A spacer 226 may be disposed on the bank layer 224.

In the exemplary embodiment, the second electrode 227 which is a cathode electrode may be disposed on a top surface and a side surface of the emission layer 225 so as to be opposite to the first electrode 223 with the emission layer 225 therebetween. The second electrode 227 may be integrally formed on the entire surface of the active area. When the second electrode 227 is applied to a top-emission type organic light emitting display apparatus, the second electrode may be configured by a transparent conducting film, such as indium-tin-oxide (ITO) or indium-zinc-oxide (IZO), but the exemplary embodiments of the present disclosure are not limited thereto.

In the exemplary embodiment, an encapsulation unit 228 which suppresses the moisture permeation may be further disposed on the second electrode 227. The encapsulation unit 228 may include a first inorganic encapsulation layer 228*a*, a second organic encapsulation layer 228*b*, and a third inorganic encapsulation layer 228*c* which are sequentially laminated.

The first inorganic encapsulation layer 228*a* and the third inorganic encapsulation layer 228*c* of the encapsulation unit 228 may be formed of an inorganic material, such as silicon oxide SiOx. The second organic encapsulation layer 228*b* of the encapsulation unit 228 may be formed of an organic material such as acryl resin, epoxy resin, phenolic resin, polyamide resin, or polyimide resin, but the exemplary embodiments of the present disclosure are not limited thereto.

Figure 3:
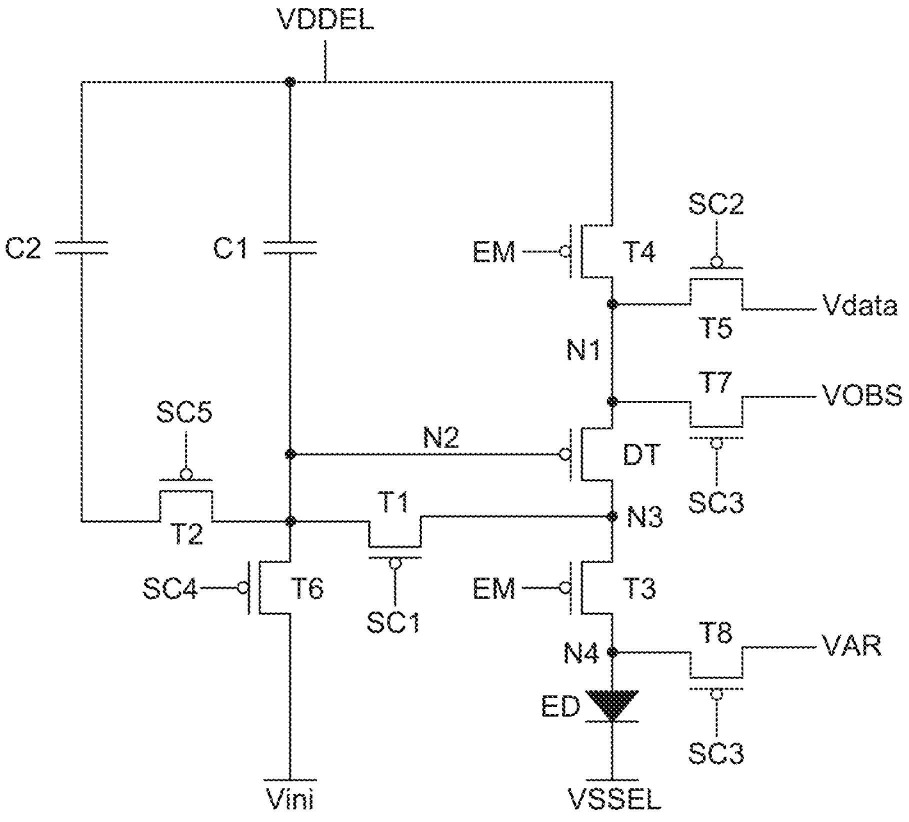
FIG. 3 is a view illustrating an example of a pixel circuit of a display apparatus according to an exemplary embodiment of the present disclosure.

FIG. 3 is a view illustrating an example of a pixel circuit of a display apparatus according to an exemplary embodiment of the present disclosure. FIG. 3 is an equivalent circuit diagram of a sub pixel included in a display apparatus according to an exemplary embodiment of the present disclosure.

Referring to FIG. 3, the display apparatus according to the exemplary embodiment of the present disclosure may include a pixel circuit including a plurality of sub pixels, for example, a plurality of pixel rows in which the plurality of sub pixels PXL of FIG. 1 is disposed. For the convenience of description, the pixel circuit of the sub pixel PXL may be referred to as a "pixel circuit," but the exemplary embodiment is not limited to this example.

In the exemplary embodiment, the pixel circuit may include a plurality of (e.g., nine) thin film transistors (or transistors) T1 to T8, and DT, a plurality of (e.g., two) capacitors C1 and C2, and a light emitting diode ED. For example, the pixel circuit may include a driving TFT DT, a first transistor T1, a second transistor T2, a third transistor T3, a fourth transistor T4, a fifth transistor T5, a capacitor Cst, and a light emitting diode ED. The pixel circuit having six TFTs and one capacitor may be a 6T1C pixel circuit, but is not limited by the term.

In the exemplary embodiment, the pixel circuit may be supplied with at least one or more of a high potential voltage VDDEL, a low potential voltage VSSEL, an initialization voltage Vini, a data voltage Vdata, an on-bias stress voltage VOBS, and a reset voltage VAR. The high potential voltage VDDEL, the low potential voltage VSSEL, the initialization voltage Vini, the on-bias stress voltage VOBS, and the reset voltage VAR are DC voltages (or direct current voltages), and the data voltage Vdata may be an AC voltage (or an alternating current voltage).

In the exemplary embodiment, the pixel circuit may be connected to at least one or more of a high potential power line, a low potential power line, a first voltage line, a second voltage line, a data voltage line, and an initialization voltage line. The high potential power line supplies the high potential voltage VDDEL, the low potential power line supplies the low potential voltage VSSEL. Further, the first voltage line supplies the on-bias stress voltage VOBS, the second voltage line supplies the reset voltage VAR, the data voltage line supplies the data voltage Vdata, and the initialization voltage line supplies the initialization voltage Vini. The high potential voltage VDDEL may be a first voltage and the low potential voltage VSSEL may be a second voltage which is lower than the first voltage, but are not limited thereto.

In the exemplary embodiment, a magnitude of a voltage supplied through the low potential power line, for example, the low potential voltage VSSEL is smaller than a magnitude of a voltage supplied through the high potential power line, for example, the high potential voltage VDDEL. The magnitude of a voltage supplied through the high potential power line is larger than the magnitude of a voltage supplied through the low potential power line.

In the exemplary embodiment, the pixel circuit may be supplied with at least one or more of a first scan signal SC1, a second scan signal SC2, a third scan signal SC3, a fourth scan signal SC4, a fifth scan signal SC5, and an emission signal EM. The first scan signal SC1, the second scan signal SC2, the third scan signal SC3, the fourth scan signal SC4, the fifth scan signal SC5, and the emission signal EM may be supplied from a gate driving circuit connected to the pixel circuit to the pixel circuit.

In the exemplary embodiment, the pixel circuit may be connected to at least one of a first scan line which supplies the first scan signal SC1, a second scan line which supplies the second scan signal SC2, a third scan line which supplies the third scan signal SC3, a fourth scan line which supplies the fourth scan signal SC4, and a fifth scan line which supplies the fifth scan signal SC5. The pixel circuit may be connected to an emission signal line which supplies the emission signal EM.

In the exemplary embodiment, the pixel circuit may be connected to the gate driving circuit. The first scan signal SC1 to fifth scan signal SC5 and the emission signal EM may be supplied from the gate driving circuit. At least one transistor of the pixel circuit may be controlled by the scan signal supplied from the gate driving circuit. For example, the first transistor T1, the second transistor T2, the fifth transistor T5, and the sixth transistor T6 may be controlled by a scan signal supplied from the gate driving circuit, for example, the first scan signal SC1, the second scan signal SC2, the fourth scan signal SC4, and the fifth scan signal SC5. At least the other transistor of the pixel circuit may be controlled by the emission signal EM supplied from the gate driving circuit. The third transistor T3 and the fourth transistor T4 may be controlled by the emission signal EM supplied from the gate driving circuit.

In the exemplary embodiment, at least one of the driving transistor DT, the third transistor T3, the fourth transistor T4, the fifth transistor T5, the seventh transistor T7, and the eighth transistor T8 may be a p-type transistor. At least one of the first transistor T1, the second transistor T2, and the sixth transistor T6 may be an n-type transistor. The n-type transistor may be implemented to include the oxide semiconductor layer, but is not limited thereto.

In the case of p-type transistor, a low-level voltage (or a low level signal) of each driving signal (for example, the first scan signal SC1 to fifth scan signal SC5, and the emission signal EM) may be a gate-on voltage which turns on the transistors. Further, a high-level voltage (or a high level signal) of each driving signal may be a gate-off voltage which turns off the transistors. In the case of n-type transistor, a low-level voltage of each driving signal may be a gate-off voltage which turns off the transistors and a high-level voltage of each driving signal may be a gate-on voltage which turns on the transistors.

Here, the low-level voltage may correspond to a predetermined voltage (or a previously set voltage) which is lower than a high level voltage. The high-level voltage may correspond to a predetermined voltage (or a previously set voltage) which is higher than the low-level voltage.

According to the exemplary embodiment of the present disclosure, the low-level voltage may be a first voltage and the high level voltage may be a second voltage, but the exemplary embodiment of the present disclosure is not limited thereto. In this case, the first voltage may be lower than the second voltage.

In the exemplary embodiment, the driving transistor DT is a transistor for driving the light emitting diode OLED, which may be a driving TFT. The driving transistor DT may include a gate electrode, a first electrode, and a second electrode. The first electrode of the driving transistor DT may be connected to the first node N1. The gate electrode of the driving transistor DT may be connected to the second node N2. The driving transistor DT is turned on or turned off by the voltage of the second node and may transmit a voltage which is supplied to the first node N1 during the turned-on state to the third node N3.

In the exemplary embodiment, the first electrode of the driving transistor DT may be connected to the fourth transistor T4, the fifth transistor T5, and the seventh transistor T7. For example, the first electrode of the driving transistor DT may be connected to a second electrode of the fourth transistor T4, a second electrode of the fifth transistor T5, and a second electrode of the seventh transistor T7. The second electrode of the driving transistor DT may be connected to the first transistor T1 and the third transistor T3. For example, the second electrode of the driving transistor DT may be connected to the second electrode of the first transistor T1 and the first electrode of the third transistor T3.

The first electrode or the second electrode of the driving transistor DT may correspond to a source electrode or a drain electrode. For example, the first electrode corresponds to the source electrode and the second electrode corresponds to the drain electrode. As another example, the second electrode corresponds to the source electrode and the first electrode may correspond to the drain electrode.

In the exemplary embodiment, the first transistor T1 may be connected to the gate electrode and the second electrode of the driving transistor DT. The first electrode of the first transistor T1 is connected to the second node N2 and the second electrode may be connected to the third node N3. The gate electrode of the first transistor T1 may be connected to the first scan line. The first transistor T1 may be supplied with the first scan signal SC1 through the first scan line.

In the exemplary embodiment, the first electrode of the first transistor T1 may be connected to the second transistor T2, the sixth transistor, the driving transistor DT, and the first capacitor C1. For example, the first electrode of the first transistor T1 may be connected to the second electrode of the second transistor T2, the first electrode of the sixth transistor T6, the gate electrode of the driving transistor DT, and the first capacitor C1.

In the exemplary embodiment, the first transistor T1 may be an n-type transistor. For example, the first transistor T1 may include an oxide semiconductor layer. In this case, the first transistor T1 may be an oxide transistor. However, it is not limited thereto and the first transistor T1 may be implemented by one of various transistors which may be implemented to be n-types.

In the exemplary embodiment, the second transistor T2 may be connected to the gate electrode of the driving transistor DT and the first transistor T1. The transistor T2 may be connected to the second node N2. For example, the second electrode of the second transistor T2 may be connected to the second node N2. The gate electrode of the second transistor T2 may be connected to the fifth scan line. The second transistor T2 may be supplied with the fifth scan signal SC5 through the fifth scan line. The second transistor T2 may be turned on or turned off by the fifth scan signal SC5.

In the exemplary embodiment, the second transistor T2 may be connected to the second capacitor C2. For example, the first electrode of the second transistor T2 may be connected to the second capacitor C2. The second electrode of the second transistor T2 may be connected to the first transistor T1, the sixth transistor T6, the driving transistor DT, and the first capacitor C1. For example, the second electrode of the second transistor T2 may be connected to the first electrode of the first transistor T1, the first electrode of the sixth transistor T6, the gate electrode of the driving transistor DT, and the first capacitor C1.

In the exemplary embodiment, the second transistor T2 may be an n-type transistor. For example, the second transistor T2 may include an oxide semiconductor layer. In this case, the second transistor T2 may be an oxide transistor. However, it is not limited thereto and the second transistor T2 may be implemented by one of various transistors which may be implemented to be n-types.

In the exemplary embodiment, the third transistor T3 may be connected to the second electrode of the driving transistor DT and the first transistor. The first electrode of the third transistor T3 is connected to the third node N3 and the second electrode may be connected to the fourth node N4. The gate electrode of the third transistor T3 may be connected to the emission signal line which supplies the emission signal EM. The third transistor T3 may be turned on or turned off according to the emission signal EM supplied from the emission signal line to the gate electrode.

In the exemplary embodiment, the first electrode of the third transistor T3 may be connected to the first transistor T1 and the driving transistor DT. For example, the first electrode of the third transistor T3 may be connected to the second electrode of the first transistor T1 and the second electrode of the driving transistor DT. The second electrode of the third transistor T3 may be connected to the eighth transistor T8 and the light emitting diode ED. For example, the second electrode of the third transistor T3 may be connected to the second electrode of the eighth transistor T8 and the anode electrode of the light emitting diode ED.

In the exemplary embodiment, the fourth transistor T4 may be connected to the first electrode of the driving transistor DT and the high potential power line. The fourth transistor T4 may be further connected to at least one of the fifth transistor T5, the seventh transistor T7, the first capacitor C1, and the second capacitor C2. For example, the fourth transistor T4 may be further connected to at least one of the second electrode of the fifth transistor T5, the second electrode of the seventh transistor T7, the first capacitor C1, and the second capacitor C2.

In the exemplary embodiment, the gate electrode of the fourth transistor T4 may be connected to the emission signal line which supplies the emission signal EM. The fourth transistor T4 may be turned on or turned off according to the emission signal EM supplied from the emission signal line to the gate electrode.

In the exemplary embodiment, the fifth transistor T5 may be connected to the first electrode of the driving transistor DT and the data voltage line which supplies the data voltage Vdata. The first electrode of the fifth transistor T5 is connected to the data voltage line. The second electrode of the fifth transistor T5 may be connected to the fourth transistor T4, the seventh transistor T7, and the driving transistor DT. For example, the second electrode of the fifth transistor T5 may be connected to the second electrode of the fourth transistor T4, the second electrode of the seventh transistor T7, and the first electrode of the driving transistor DT.

In the exemplary embodiment, the gate electrode of the fifth transistor T5 may be connected to the second scan line which supplies a second scan signal SC2. The fifth transistor T5 may be turned on or turned off according to the second scan signal SC2 which is supplied from the second scan signal line to the gate electrode. When the fifth transistor T5 is turned on, the data voltage Vdata may be supplied from the first electrode of the fifth transistor T5 to the second electrode. The second electrode is connected to the first node N1 to supply the data voltage Vdata to the first node N1.

In the exemplary embodiment, the sixth transistor T6 may be connected to the gate electrode of the driving transistor DT and the initialization voltage line. The initialization voltage line may include a line which supplies the initialization voltage Vini. The sixth transistor T6 may be supplied with the initialization voltage Vini through the initialization voltage line. The initialization voltage Vini may be a voltage which supplied to stabilize the change in the capacitance formed in the gate electrode of the driving transistor DT. According to the exemplary embodiment, the initialization voltage Vini may be a stabilization voltage, but is not limited thereto.

In the exemplary embodiment, the first electrode of the sixth transistor T6 is connected to the initialization voltage line. The second electrode of the sixth transistor T6 may be connected to the first transistor T1, the second transistor T2, the driving transistor DT, and the first capacitor C1. For example, the second electrode of the sixth transistor T6 may be connected to the first electrode of the first transistor T1, the second electrode of the second transistor T2, the gate electrode of the driving transistor DT, and the first capacitor C1.

In the exemplary embodiment, the gate electrode of the sixth transistor T6 may be connected to the fourth scan line. The sixth transistor T6 may be supplied with the fourth scan signal SC4 through the fourth scan line. The sixth transistor T6 may be turned on or turned off by the fourth scan signal SC4. When the sixth transistor T6 is turned on, the initialization voltage Vini is supplied from the first electrode of the sixth transistor T6 to the second electrode. The second electrode of the sixth transistor T6 may be connected to the second node N2. When the sixth transistor T6 is turned on, the initialization voltage Vini may be supplied to the second node N2.

In the exemplary embodiment, the seventh transistor T7 may be connected to the first electrode of the driving transistor DT and the first voltage line. The first voltage line may include a line which supplies the on bias stress voltage VOBS. According to the exemplary embodiment, the first voltage line may be a bias line or a VOBS line, but is not limited by this term.

According to the exemplary embodiment, when the display apparatus is driven in a first mode which is a high-speed driving frequency and then changed to a second mode which is a low speed driving frequency, an afterimage due to a hysteresis phenomenon may be visibly recognized. Here, the high-speed driving frequency corresponds to a frequency value which is equal to or higher than a predetermined frequency value and the low speed driving frequency corresponds to a frequency value which is lower than a predetermined frequency value. In order to improve the recognition by the hysteresis phenomenon, the display apparatus may perform an on-bias process (or an on-bias operation). The on-bias process may be an operation to set the driving transistor DT to an on-bias state by applying the on-bias stress voltage VOBS to the first electrode or the second electrode of the driving transistor DT before starting the emission period.

The on-bias stress voltage VOBS may be a voltage which is supplied to the pixel circuit to relieve the hysteresis of the driving transistor DT and improve the response characteristic. The on-bias stress voltage VOBS may have a predetermined value. The on-bias stress voltage VOBS may have the largest value, among voltages which are applied to the pixel circuit, but is not limited thereto. An operation period of the pixel circuit in which the on-bias stress voltage VOBS is input may include a period in which an operation of the pixel circuit is constantly maintained before a period in which the light emitting diode emits light.

In the exemplary embodiment, the first electrode of the seventh transistor T7 may be connected to the first voltage line. The second electrode of the seventh transistor T7 may be connected to the first node N1. The second electrode of the seventh transistor T7 may be connected to the first electrode of the driving transistor DT, the second electrode of the fourth transistor T4, and the second electrode of the fifth transistor T5.

In the exemplary embodiment, the gate electrode of the seventh transistor T7 may be connected to the third scan line which supplies the third scan signal SC3. The seventh transistor T7 may be turned on or turned off according to the third scan signal SC3. When the seventh transistor T7 is turned on, the on-bias stress voltage VOBS may be supplied from the first electrode to the second electrode. The second electrode of the seventh transistor T7 may be connected to the first node N1. When the seventh transistor T7 is turned on, the on-bias stress voltage VOBS may be supplied to the first node N1.

In the exemplary embodiment, the eighth transistor T8 may be connected to the second voltage line and the light emitting diode ED. The second voltage line may include a reset voltage line which supplies the reset voltage VAR. The reset voltage VAR may be a voltage which is supplied to reset the anode electrode of the light emitting diode ED. The reset voltage VAR has a predetermined value and when the reset voltage VAR is supplied to the anode electrode of the light emitting diode ED, the anode electrode of the light emitting diode may be reset.

The first electrode of the eighth transistor T8 is connected to the second voltage line and the second electrode of the eighth transistor T8 may be connected to the fourth node N4. The gate electrode of the eighth transistor T8 may be connected to the third scan line which supplies the third scan signal SC3. The eighth transistor T8 may be turned on or turned off according to the third scan signal SC3 which is supplied from the third scan line to the gate electrode. When the eighth transistor T8 is turned on, the reset voltage VAR may be supplied from the first electrode of the eighth transistor T8 to the second electrode (or the fourth node).

In the exemplary embodiment, the first electrode of the eighth transistor T8 may be connected to the second voltage line. The second voltage line may be a reset voltage line which supplies the reset voltage VAR. The second electrode of the eighth transistor T8 is connected to the light emitting diode ED and the third transistor T3. For example, the second electrode of the eighth transistor T8 may be connected to the anode electrode of the light emitting diode ED and the second electrode of the third transistor T3.

In the exemplary embodiment, the light emitting diode ED may be connected to the fourth node N4 and the low potential power line. The low potential power line may include a line which supplies the low potential voltage VSSEL. The low potential voltage VSSEL may be determined in advance as a value lower than the above-described high potential voltage VDDEL.

For example, the anode electrode of the light emitting diode ED may be connected to the fourth node N4. Therefore, the anode electrode of the light emitting diode ED may be connected to the other configurations to be connected to the fourth node N4. For example, the anode electrode of the light emitting diode ED may be connected to the third transistor T3 and the eighth transistor T8. The anode electrode of the light emitting diode ED may be connected to the second electrode of the third transistor T3 and the second electrode of the eighth transistor T8.

In the exemplary embodiment, the light emitting diode ED may include an anode electrode, an emission layer, and a cathode electrode. The light emitting diode ED may include at least one of an organic light emitting diode, an inorganic light emitting diode, and a quantum dot light emitting diode. When the light emitting diode ED is an organic light emitting diode, the emission layer of the light emitting diode ED may include an organic emission layer including an organic material. For example, the light emitting diode ED may correspond to the light emitting diode unit 280 of FIG. 2. The light emitting diode ED has been described in more detail with reference to FIGS. 1 and 2, so that a specific description thereof will be omitted.

In the exemplary embodiment, the first capacitor C1 may be connected to the high potential power line and the second node N2. For example, the first capacitor C1 may be connected between the high potential power line and the second node N2. A capacity of the first capacitor C1 may be equal to or smaller than a capacity of the second capacitor C2.

In the exemplary embodiment, the first capacitor C1 may include a storage capacitor. The storage capacitor may be a component which charges an electric energy (for example, charges or a data voltage) to maintain a constant voltage for one frame. For example, when the input of the voltage stops during the process of driving a pixel circuit, the first capacitor C1 supplies a stored electric energy to the driving transistor DT to maintain the driving of the driving transistor DT during one frame. The first capacitor C1 may be configured by a parasitic capacitor which is an internal capacitor. However, it is not limited thereto and the first capacitor may be an external capacitor disposed at the outside of the driving transistor DT.

In the exemplary embodiment, the second capacitor C2 may be connected to the high potential power line and the second transistor T2. For example, the second capacitor C2 may be connected between the high potential power line and the second transistor T2. A capacity of the second capacitor C2 may be equal to or larger than a capacity of the first capacitor C1.

In the exemplary embodiment, the second capacitor C2 may be a compensation capacitor for compensation. For example, the second capacitor C2 may be a compensation capacitor to reduce the flicker phenomenon.

In the exemplary embodiment, the first transistor T1, the second transistor T2, and the sixth transistor T6 may be n-type transistors. For example, the first transistor T1, the second transistor T2, and the sixth transistor T6 are n-type transistors and may include an oxide semiconductor layer. As another example, the first transistor T1 and the sixth transistor T6 are n-type transistors and may include an oxide semiconductor layer. The second transistor T2 is an n-type transistor and may include another semiconductor layer, instead of the oxide semiconductor layer. For example, the second transistor T2 may include an n-type amorphous silicon (a-Si) or a low temperature poly silicon (LTPS).

The pixel circuit according to the exemplary embodiment of the present disclosure may be driven at various frequencies. The driving of the pixel circuit may include a refresh frame in which data is written and an anode reset frame in which data is not written. The refresh frame and the anode reset frame have different optical characteristics so that a flicker phenomenon which is the screen blinking may occur. The pixel circuit compensates for the second node N2 connected to the gate electrode of the driving transistor DT using the second capacitor C2 and the second transistor T2 to improve the above-described flicker phenomenon.

For example, the pixel circuit may ensure the same effect as operating at a frequency corresponding to twice the driving frequency. To be more specific, for example, even though the pixel circuit is actually driven at the driving frequency of 10 Hz, the re-compensation is performed by the second capacitor C2 and the second transistor T2 to ensure the flicker performance which is driven at a driving frequency of 20 Hz.

In the exemplary embodiment, when at least one of the second capacitor C2 and the second transistor T2 is not provided in the pixel circuit, if the low-speed driving (for example, 10 Hz to 30 Hz) of the pixel circuit is implemented, coupling occurs between the data line and the node in the pixel structure or charge injection may occur in the first transistor T1. In this case, flicker phenomenon may occur more than in the pixel circuit of FIG. 3. For example, more blinking phenomenon of the display panel may occur more than in the pixel circuit of FIG. 3.

Figure 4:
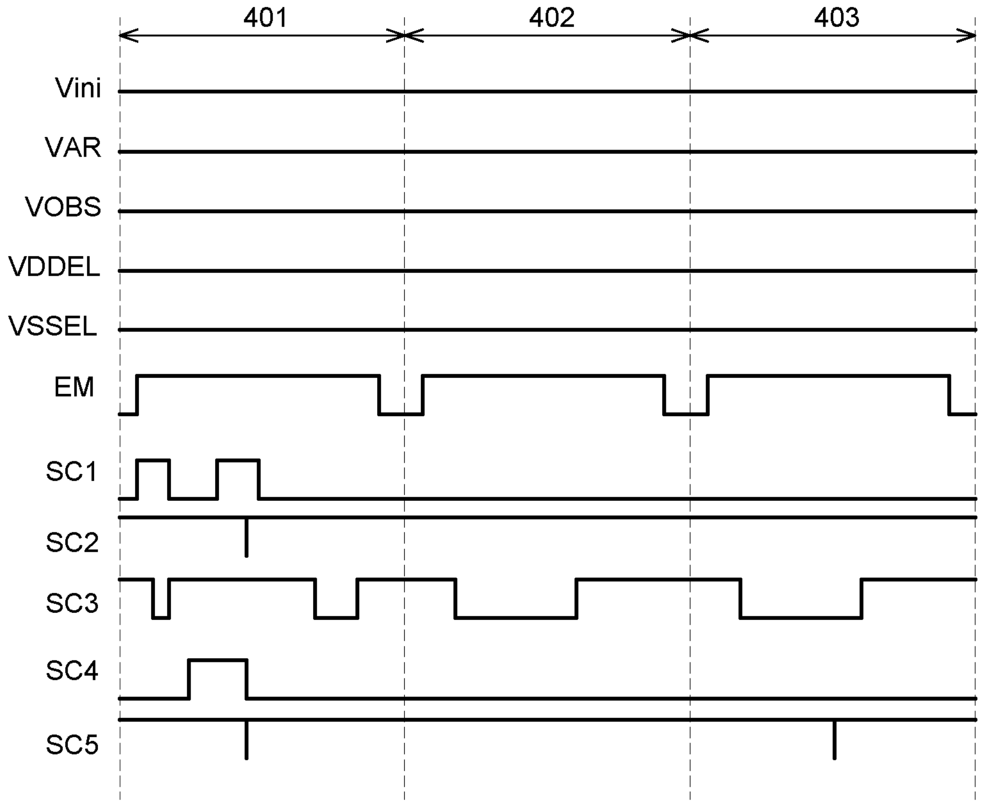
FIG. 4 is a view illustrating an example of a signal flow of a pixel circuit of a display apparatus according to an exemplary embodiment of the present disclosure.

FIG. 4 is a view illustrating an example of a signal flow of a pixel circuit of a display apparatus according to an exemplary embodiment of the present disclosure. FIG. 4 is a view for explaining a timing of a signal to be supplied to a pixel circuit of a display apparatus.

Referring to FIG. 4, the pixel circuit may have a plurality of operation periods. For example, the pixel circuit may have an operation period corresponding to a refresh frame 401, a first anode reset frame 402, and a second anode reset frame 403.

In the exemplary embodiment, a holding period may be disposed between at least some periods of the refresh frame 401, the first anode reset frame 402, and the second anode reset frame 403. The holding period may include a period in which a state in a start point of the holding period is maintained.

Even though in FIG. 4, it is illustrated that the refresh frame 401, the first anode reset frame 402, and the second anode reset frame 403 are continuous, but is not limited thereto. Further, the refresh frame 401, the first anode reset frame 402, and the second anode reset frame 403 may be disposed to be divided from each other. For example, an additional signal period may be disposed between the refresh frame 401, the first anode reset frame 402, and the second anode reset frame 403. As another example, an order of the refresh frame 401, the first anode reset frame 402, and the second anode reset frame 403 may vary according to the driving frequency of the display panel. A more specific example with regard to this will be described with reference to FIGS. 8 to 11.

Referring to FIG. 4, during the driving period of the pixel circuit, the initialization voltage Vini, the reset voltage VAR, the on-bias stress voltage VOBS, the high potential voltage VDDEL, and the low potential power voltage VSSEL are constant voltages to maintain a constant voltage value. For example, in the refresh frame 401, the first anode reset frame 402, and the second anode reset frame 403, the initialization voltage Vini, the reset voltage VAR, the on-bias stress voltage VOBS, the high potential voltage VDDEL, and the low potential power voltage VSSEL may maintain a constant voltage value.

In the exemplary embodiment, the data voltage may have a variable value corresponding to input data. Therefore, even though the value of the data voltage Vdata is not illustrated on the signal flow of FIG. 4, the data voltage Vdata is input during the driving period of the pixel circuit.

In the exemplary embodiment, the emission signal EM may have a low value at a specific time interval. In a low period in which the emission signal EM has a low value, the light emitting diode may emit light. According to the exemplary embodiment, the low period of the emission signal EM may be an emission period, but is not limited by the term.

In the exemplary embodiment, the refresh frame 401 may include an operation period of the pixel circuit which initializes the gate electrode of the driving transistor and writes a data voltage in the driving transistor. In the refresh frame 401, the second scan signal SC2 has a low value and the first scan signal SC1 and the fifth scan signal SC5 may have high values. A transistor to which the second scan signal SC2 is supplied is a p-type and a transistor to which the first scan signal SC1 and the fifth scan signal SC5 are supplied may be an n-type. In this case, the transistor to which the second scan signal SC2, the first scan signal SC1, and the fifth scan signal SC5 are supplied may be in an on-state. A more specific example with regard to this will be described with reference to FIG. 5.

In the exemplary embodiment, in the first anode reset frame 402, a node to which the light emitting diode is connected, for example, the fourth node N4 of FIG. 3 is initialized and the on-bias stress voltage VOBS may be supplied to the first electrode of the driving transistor. Therefore, during the low-speed driving, the flicker phenomenon may be reduced. A more specific example with regard to this will be described with reference to FIG. 6.

In the exemplary embodiment, in the second anode reset frame 403, data of a previous refresh frame may be written in the gate electrode of the driving transistor. For example, in the second anode reset frame 403, the n-type transistor to which the fifth scan signal SC5 is supplied may be turned on based on the fifth scan signal SC5 which is input as a high value. A more specific example related thereto will be described with reference to FIG. 7.

In the exemplary embodiment, in at least a part of the refresh frame 401, the first scan signal SC1 and the fourth scan signal SC4 may have a high value. In at least the other part of the refresh frame 401, the first scan signal SC1 and the fourth scan signal SC4 may have a low value. The first scan signal SC1 and the fourth scan signal SC4 may have a low value in the first anode reset frame 402 and the second anode reset frame 403. For example, in the first anode reset frame 402 and the second anode reset frame 403, the first scan signal SC1 and the fourth scan signal SC4 do not have a high value, but may be represented only by a low value. As another example, in the first anode reset frame 402 and the second anode reset frame 403, the first scan signal SC1 and the fourth scan signal SC4 may maintain a low value. The transistor to which the first scan signal SC1 and the fourth scan signal SC4 are input may be an n-type and in this case, when the first scan signal SC1 and the fourth scan signal SC4 have a low value, the transistor may be turned off.

In the exemplary embodiment, there may be a plurality of periods in the refresh frame 401 in which the first scan signal SC1 has a high value. There may be one period in the refresh frame 401 in which the fourth scan signal SC4 has a high value. A period (or a high period) in which the first scan signal SC1 has a high value and a period in which the fourth scan signal SC4 has a high value may be divided. For example, at least a part of the high period of the first scan signal SC1 and the high period of the fourth scan signal SC4 may not overlap.

In the exemplary embodiment, the second scan signal SC2 may have a low value in at least a partial period of the refresh frame 401. The second scan signal SC2 may have a high value other than the period in which the second scan signal has a low value. For example, the second scan signal SC2 may have a high value in the first anode reset frame 402 and the second anode reset frame 403. A transistor to which the second scan signal SC2 is input may be a p-type and in this case, when the second scan signal SC2 has a low value, the transistor may be turned on.

In the exemplary embodiment, the third scan signal SC3 may be driven in a first pattern in the refresh frame 401. The third scan signal SC3 may be driven in a second pattern in the first anode reset frame 402 and the second anode reset frame 403. In this case, a second pattern of the third scan signal SC3 may be repeated in the first anode reset frame 402 and the second anode reset frame 403.

In the exemplary embodiment, the fifth scan signal SC5 may have a low value in at least a partial period of each of the refresh frame 401 and the second anode reset frame 403. The fifth scan signal SC5 may have a high value other than the period in which the fifth scan signal has a low value. For example, the fifth scan signal SC5 may have a high value in the first anode reset frame 402. A transistor to which the fifth scan signal SC5 is input may be an n-type and in this case, when the fifth scan signal SC5 has a low value, the transistor may be turned off.

According to the exemplary embodiment, the refresh frame 401 is a first driving period, the first anode reset frame 402 is a second driving period, and the second anode reset frame 403 is a third driving period, but the exemplary embodiments of the present disclosure are not limited thereto.

In the exemplary embodiment, the low value may be a voltage value which is lower than the high value. The low value may be a value belonging to a range of a value which turns on the p-type transistor or turns off the n-type transistor. For example, the low value may include a voltage corresponding to the range of −8 V to −12 V, but the exemplary embodiments of the present disclosure are not limited thereto. The high value may be a value belonging to a range of a voltage value which turns off the p-type transistor or turns on the n-type transistor. For example, the high value may include a voltage corresponding to the range of 6V to 16V, but the exemplary embodiments of the present disclosure are not limited thereto.

Figure 5:
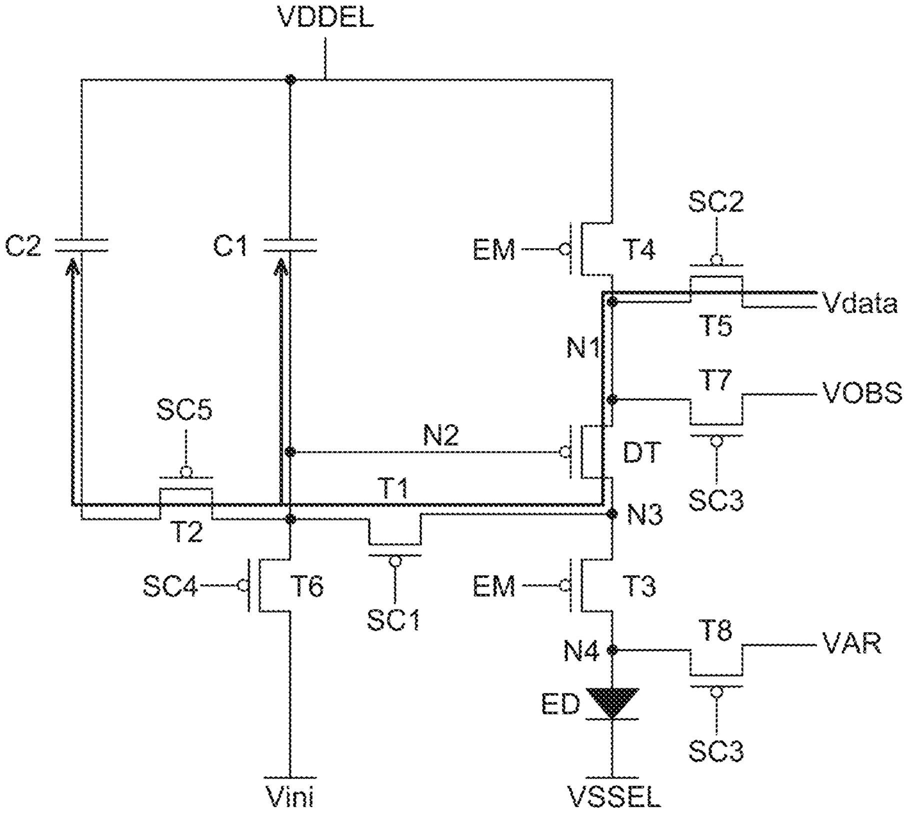
FIG. 5 is a view for explaining the driving of a pixel circuit of a display apparatus in a first driving period according to an exemplary embodiment of the present disclosure.

FIG. 5 is a view for explaining the driving of a pixel circuit of a display apparatus in a first driving period according to an exemplary embodiment of the present disclosure. FIG. 5 illustrates an example of an operation of a pixel circuit during a refresh frame.

Referring to FIG. 5, the fifth transistor T5 may be turned on during the first driving period. As the fifth transistor T5 is turned on, the data voltage Vdata may be supplied from the first electrode of the fifth transistor T5 to the second electrode. The first electrode of the driving transistor DT, for example, the first node N1 may be charged with the data voltage Vdata.

In the exemplary embodiment, the driving transistor DT, the first transistor T1, and the second transistor T2 may be turned on. The data voltage Vdata may be charged in the second node N2 and the second electrode of the second transistor T2. The second electrode of the second transistor T2 may be an electrode which is connected to the second capacitor C2 and thus the second capacitor C2 may be charged with the data voltage Vdata. As the second node N2 is charged with the data voltage Vdata, the first capacitor C1 may be charged with the data voltage Vdata. During this process, the gate electrode of the driving transistor DT, for example, the second node N2 may be initialized.

Figure 6:
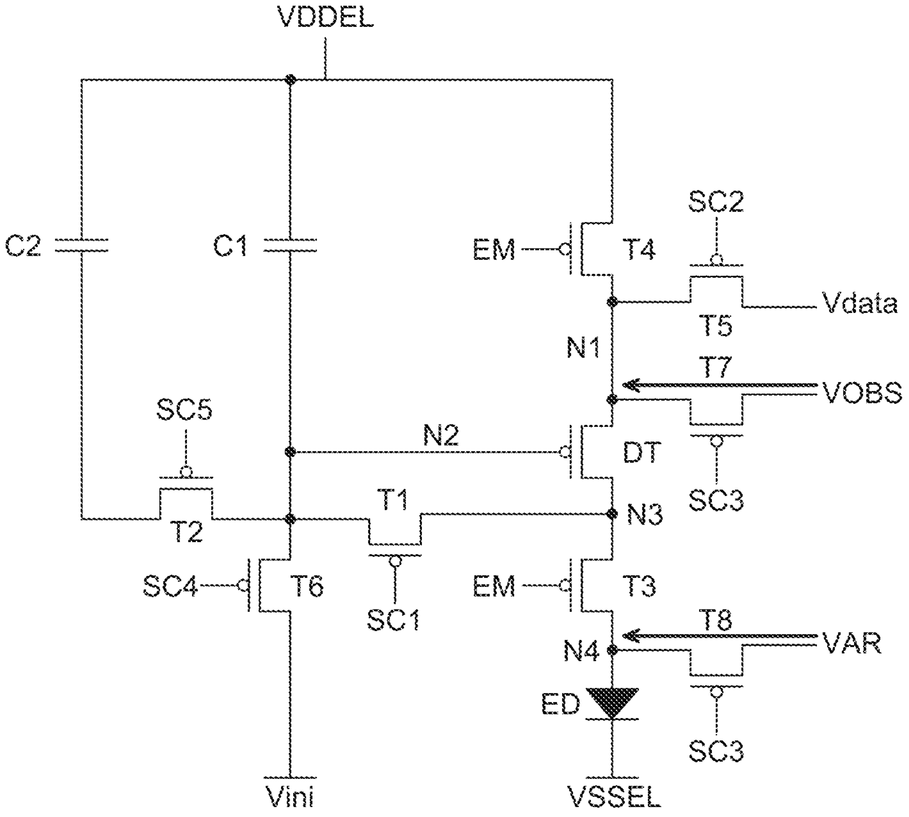
FIG. 6 is a view for explaining the driving of a pixel circuit of a display apparatus in a second driving period according to an exemplary embodiment of the present disclosure.

FIG. 6 is a view for explaining the driving of a pixel circuit of a display apparatus in a second driving period according to an exemplary embodiment of the present disclosure. FIG. 6 illustrates an example of an operation of a pixel circuit in the first anode reset frame.

Referring to FIG. 6, during the second driving period, the seventh transistor T7 and the eighth transistor T8 may be turned on. The first node N1 may be charged with the on-bias stress voltage VOBS based on the seventh transistor T7 which is turned on. The fourth node N4 may be charged with the reset voltage VAR based on the eighth transistor T8 which is turned on.

In the exemplary embodiment, the on-bias stress voltage VOBS may be a signal having the highest voltage value, among signals supplied to the pixel circuit. In this case, when the on-bias stress voltage VOBS is input to the first node N1, the hysteresis phenomenon may be relieved. Therefore, the flicker phenomenon during the low-speed driving may be reduced by the relieved hysteresis phenomenon.

In the exemplary embodiment, the fourth node N4 may be a node to which the anode electrode of the light emitting diode ED is connected. In this case, the reset voltage VAR may be input to the anode electrode of the light emitting diode ED. Accordingly, the anode electrode of the light emitting diode ED may be reset.

Figure 7:
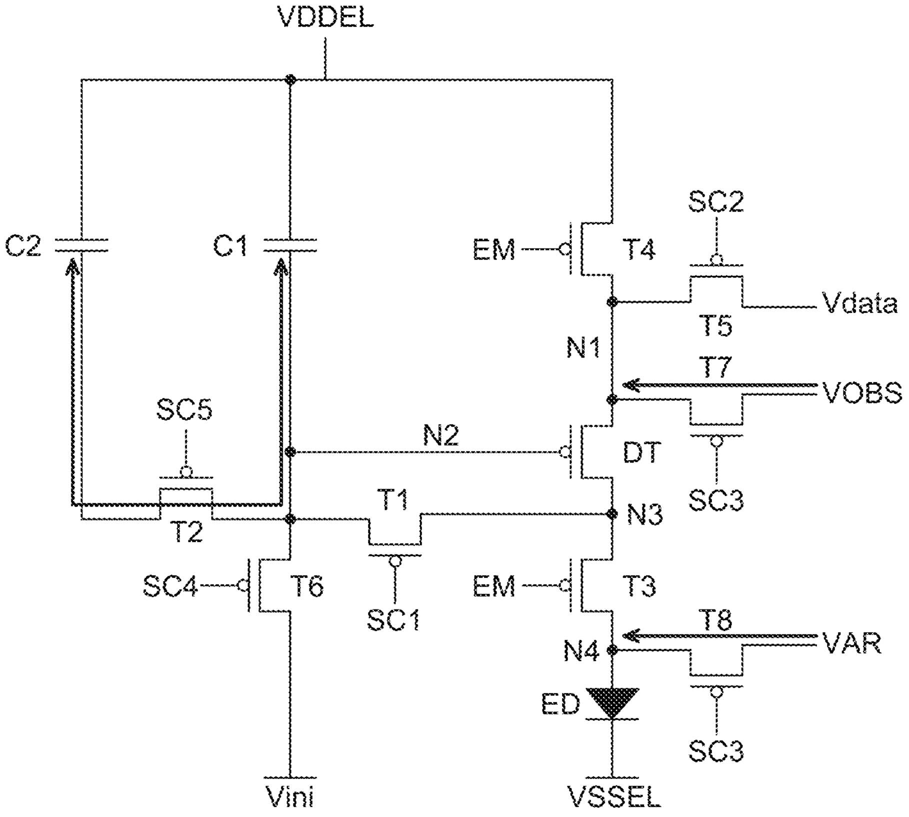
FIG. 7 is a view for explaining the driving of a pixel circuit of a display apparatus in a third driving period according to an exemplary embodiment of the present disclosure.

FIG. 7 is a view for explaining the driving of a pixel circuit of a display apparatus in a third driving period according to an exemplary embodiment of the present disclosure. FIG. 7 illustrates an example of an operation of a pixel circuit in the second anode reset frame.

Referring to FIG. 7, during the third driving period, the fifth transistor T5, the seventh transistor T7, and the eighth transistor T8 may be turned on. As the fifth transistor T5 is turned on, the first capacitor C1 or the second node N2 may be charged with a voltage charged in the second capacitor C2. The gate electrode of the driving transistor DT is connected to the second node N2, so that a voltage which is charged in the second capacitor C2 during the first driving period before performing the third driving period, for example, through the refresh frame may be input to the gate electrode of the driving transistor DT.

As the seventh transistor T7 and the eighth transistor T8 are turned on, the first node N1 is charged with the on-bias stress voltage VOBS and the fourth node N4 may be charged with the reset voltage VAR.

In the exemplary embodiment, as the voltage stored in the second capacitor C2 during the third driving period is supplied to the second node N2, the gate electrode of the driving transistor DT may be compensated. For example, the compensation operation may ensure the same effect as operating at a frequency corresponding to twice the driving frequency of the current pixel circuit. The flicker phenomenon is caused during the operation at a low-speed frequency, so that if the frequency is increased, the flicker phenomenon may be improved. According to the exemplary embodiment, even though the operation is substantially performed at the low-speed frequency, the effect of operating at a frequency corresponding to twice the low speed frequency may be ensured so that the flicker phenomenon may be effectively reduced.

In the exemplary embodiment, the operations of the seventh transistor T7 and the eighth transistor T8 may be the same as in the first anode reset frame which has been described in detail with reference to FIG. 6.

The operation period described in FIGS. 5 to 7 is a period described with regard to the exemplary embodiment of the present disclosure so that the operation period of the pixel circuit may further include various periods other than the operation period of FIGS. 5 to 7. For example, the operation period of the pixel circuit may further include an emission period in which the light emitting diode ED emits light and a holding period in which the operation of the pixel circuit is temporarily stopped and maintains a previous state.

Figure 8:
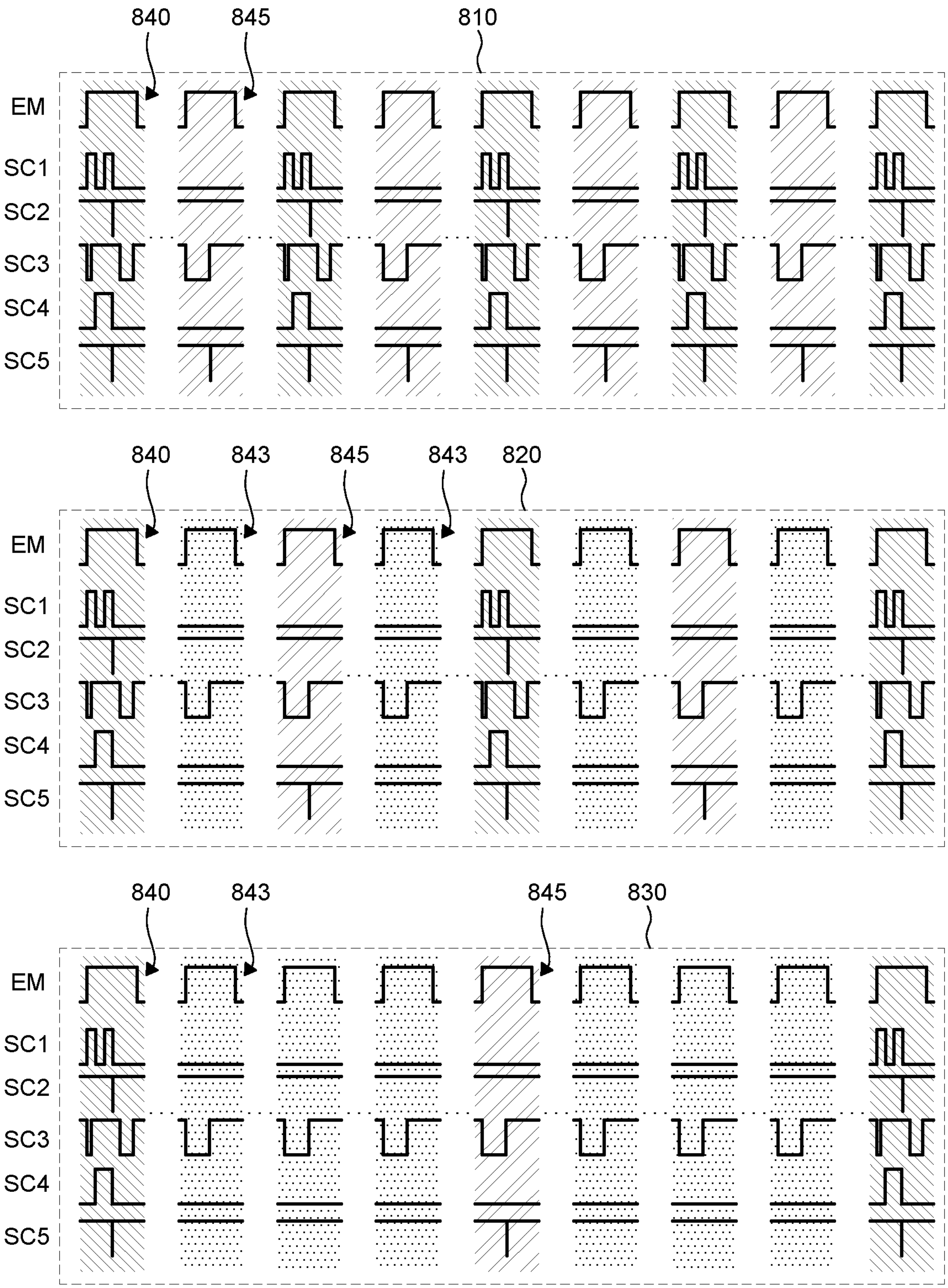
FIG. 8 illustrates timing diagrams of a signal according to a driving frequency of a display apparatus according to an exemplary embodiment of the present disclosure.

FIG. 8 illustrates timing diagrams of a signal according to a driving frequency of a display apparatus according to an exemplary embodiment of the present disclosure. FIG. 8 illustrates an example of placement of the first driving period of FIG. 5, the second driving period of FIG. 6, and the third driving period of FIG. 7 for every driving frequency.

The display apparatus may be driven at various driving frequencies. The first timing diagram 810 illustrates that the display apparatus is driven at 120 Hz. The second timing diagram 820 illustrates that the display apparatus is driven at 60 Hz. The third timing diagram 830 illustrates that the display apparatus is driven at 30 Hz. However, it is not limited thereto and a frequency corresponding to the first timing diagram 810 is higher than a frequency corresponding to the second timing diagram 820 and a frequency corresponding to the second timing diagram 820 may be higher than a frequency corresponding to the third timing diagram 830.

Referring to the first timing diagram 810 of FIG. 8, when the display apparatus is driven at 120 Hz, the third driving period 845 may be performed after performing the first driving period 840. There may be at least one of the emission period and the holding period between the first driving period 840 and the third driving period 845. The driving is performed in the order of the first driving period 840 and the third driving period 845 and the driving with the same pattern may be repeated as illustrated in the drawing.

Referring to the second timing diagram 820, when the display apparatus is driven at 60 Hz, after performing the first driving period 840, the second driving period 843 is performed, and then the third driving period 845 may be performed. After performing the third driving period 845, the second driving period 843 may be performed again. The driving is performed in the order of the first driving period 840, the second driving period 843, the third driving period 845, and the second driving period 843, and the driving with the same pattern may be repeated as illustrated in the drawing. At least one of the emission period and the holding period may be further present between the driving periods.

Referring to the third timing diagram 830, when the display apparatus is driven at 30 Hz, after performing the first driving period 840, the second driving period 843 is repeated three times, and then the third driving period 845 may be performed. After performing the third driving period 845, the second driving period 843 may repeated three more times. The patterns of the driving periods may be repeated.

Figure 9:
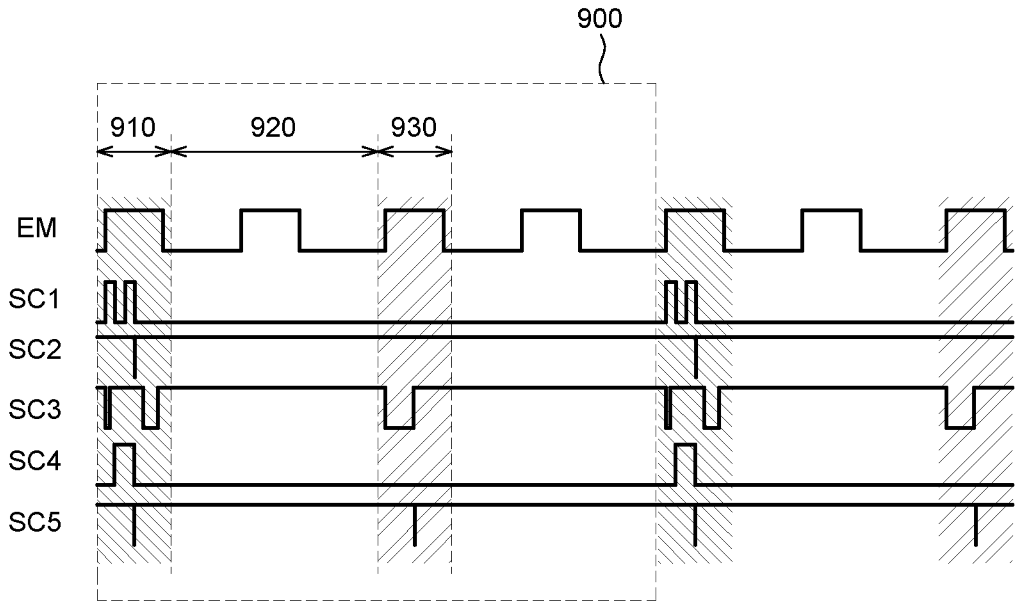
FIG. 9 is a view for explaining a signal timing when a display apparatus is driven at a first frequency according to an exemplary embodiment of the present disclosure.

FIG. 9 is a view for explaining a signal timing when a display apparatus is driven at a first frequency according to an exemplary embodiment of the present disclosure. FIG. 9 illustrates a part of the first timing diagram 810 of FIG. 8 in more detail. The first frequency may include a predetermined range of frequency period. In this case, the first frequency may include 120 Hz.

Referring to FIG. 9, when the display apparatus is driven at a first frequency, the first pattern 900 may be repeated. The first pattern 900 may include a first driving period 910 and a third driving period 930. For example, after performing the first driving period 910, the third driving period 930 may be performed.

In the exemplary embodiment, the emission period 920 and the holding period may be performed between the first driving period 910 and the third driving period 930. The emission period 920 may be a period in which a transistor to which the emission signal EM is input through the gate electrode based on the emission signal EM having a low value, for example, the third transistor T3 of FIG. 3 is turned on to apply a current to the light emitting diode. During the emission period 920, the light emitting diode may emit light. The holding period may be a period in which a previous state is maintained without performing an additional function. During the holding period, voltage values of signals at a start time of the holding period may be constantly maintained. When the emission period 920 ends, the emission signal EM is changed to a high value so that during the holding period, the emission signal EM may be maintained in a high value.

Figure 10:
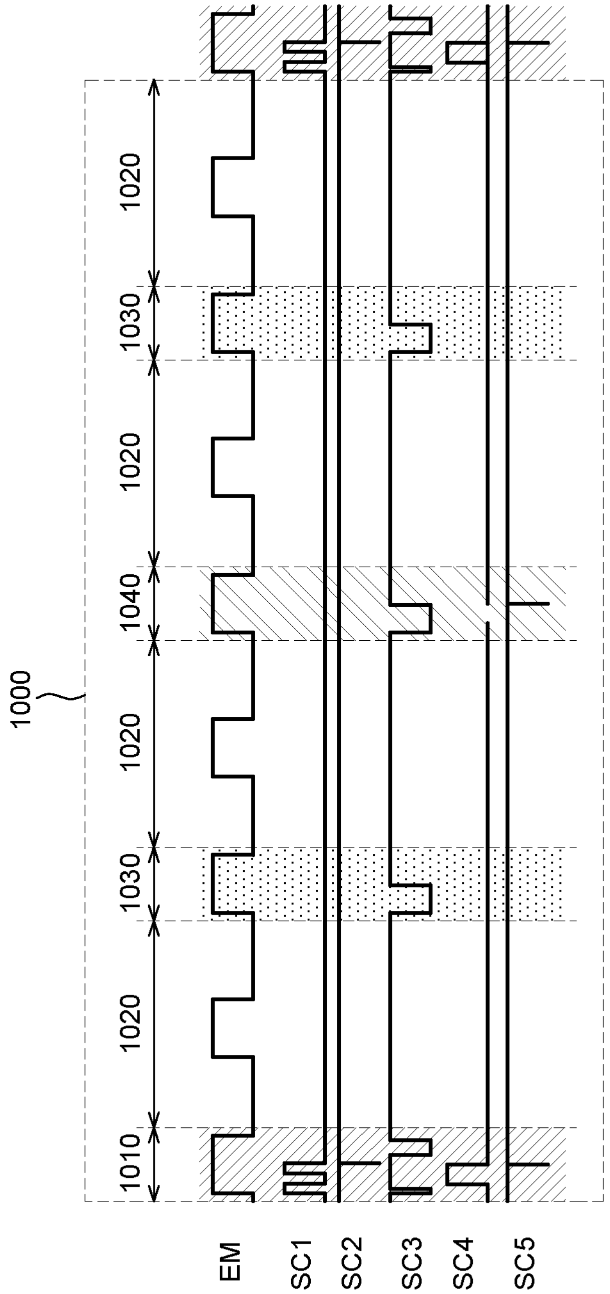
FIG. 10 is a view for explaining a signal timing when a display apparatus is driven at a second frequency according to an exemplary embodiment of the present disclosure.

FIG. 10 is a view for explaining signal flow when a display apparatus according to an exemplary embodiment of the present disclosure is driven at a second frequency. FIG. 10 illustrates at least a part of the second timing diagram 820 of FIG. 8 in more detail. The second frequency may include a predetermined range of frequency period. In this case, the second frequency may include 60 Hz.

Referring to FIG. 10, when the display apparatus is driven at a first frequency, the second pattern 1000 may be repeated. The second pattern 1000 may include a first driving period 1010, a second driving period 1030, a third driving period 1040, and an emission period 1020.

In the exemplary embodiment, after performing the first driving period 1010, the second driving period 1030 is performed, and then the third driving period 1040 may be performed. After the third driving period 1040, the second driving period 1030 may be performed again. The emission period 1020 is sequentially performed between the driving periods.

Figure 11:
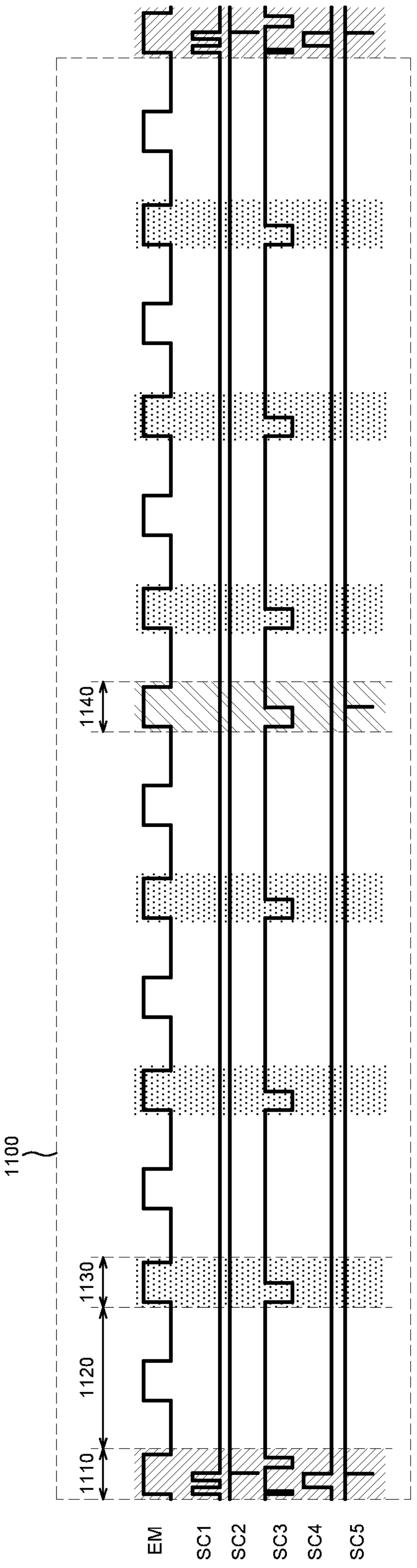
FIG. 11 is a view for explaining a signal timing when a display apparatus is driven at a third frequency according to an exemplary embodiment of the present disclosure.

FIG. 11 is a view for explaining signal flow when a display apparatus is driven at a third frequency according to an exemplary embodiment of the present disclosure. FIG. 11 illustrates at least a part of the third timing diagram 830 of FIG. 8 in more detail. The third frequency may include a predetermined range of frequency period. In this case, the third frequency may include 30 Hz.

Referring to FIG. 11, when the display apparatus is driven at a third frequency, the third pattern 1100 may be repeated. The third pattern 1100 may include a first driving period 1110, a second driving period 1130, a third driving period 1140, and an emission period 1120.

In the exemplary embodiment, after performing the first driving period 1110, the second driving period 1130 is performed three times, and then the third driving period 1140 may be performed. After the third driving period 1140, the second driving period 1130 may be performed three more times again. The emission period 1120, and the emission period 1120 may be sequentially performed between the driving periods.

In the exemplary embodiment, lengths of the driving periods of FIGS. 9 to 11, that is, the first driving period, the second driving period, and the third driving period may be constant. In this case, it is confirmed that the lengths of the patterns 900, 1000, and 1100 may vary depending on the frequency.

The exemplary embodiments of the present disclosure can also be described as follows:

A pixel circuit according to an aspect of the present disclosure includes a driving transistor including a gate electrode, a first electrode, and a second electrode, a first transistor connected to the gate electrode and the second electrode, a second transistor connected to the first transistor and the gate electrode, a third transistor connected to the second electrode and the first transistor, a first capacitor connected to the gate electrode, the first transistor, the second transistor, and a high potential power line, a second capacitor connected to the high potential power line, the first capacitor, and the second transistor and a light emitting diode connected to the third transistor and a low potential power line.

The pixel circuit may further include a fourth transistor connected to the first electrode and the high potential power line, a fifth transistor connected to the first electrode and a data voltage line and a sixth transistor connected to the gate electrode and an initialization voltage line.

The pixel circuit may be connected to a gate driving circuit, the first transistor, the second transistor, the fifth transistor, and the sixth transistor are controlled by a scan signal supplied from the gate driving circuit and the third transistor and the fourth transistor are controlled by an emission signal supplied from the gate driving circuit.

At least one of the first transistor, the second transistor, and the sixth transistor include an oxide semiconductor layer.

The pixel circuit may further include a seventh transistor connected to the first electrode and a first voltage line and an eighth transistor connected to the light emitting diode and a second voltage line.

The seventh transistor and the eighth transistor may be controlled by a scan signal supplied through the gate driving circuit.

An on-bias stress voltage may be supplied to the seventh transistor through the first voltage line and a reset voltage is supplied to the eighth transistor through the second voltage line.

A pixel circuit according to another aspect of the present disclosure includes a driving transistor which includes a gate electrode, a first electrode, and a second electrode, the first electrode being connected to a first node, the gate electrode being connected to a second node, and the second electrode being connected to a third node, a first transistor connected between the second node and the third node, a second transistor connected to the second node, a first capacitor connected between the second node and a high potential power line, a second capacitor connected between the high potential power line and the second transistor, a third transistor connected between the third node and a fourth node and a light emitting diode connected between the fourth node and a low potential power line.

The pixel circuit may further include a fourth transistor connected between the first node and the high potential power line, a fifth transistor connected between the first node and a data voltage line, and a sixth transistor connected between the second node and an initialization voltage line.

The pixel circuit may be connected to a gate driving circuit, the first transistor, the second transistor, the fifth transistor, and the sixth transistor are controlled by a scan signal supplied from the gate driving circuit and the third transistor and the fourth transistor are controlled by an emission signal supplied from the gate driving circuit.

At least one of the first transistor, the second transistor, and the sixth transistor may include an oxide semiconductor layer.

The pixel circuit may further include a seventh transistor connected between the first node and a first voltage line, and an eighth transistor connected between the fourth node and a second voltage line.

The seventh transistor and the eighth transistor may be controlled by a scan signal supplied through the gate driving circuit.

An on-bias stress voltage may be supplied to the seventh transistor through the first voltage line and a reset voltage may be supplied to the eighth transistor through the second voltage line.

Display apparatus according to an aspect of the present disclosure includes a display panel including the pixel circuit, a gate driving circuit connected to the pixel circuit and a data driving circuit connected to the pixel circuit.

Although the exemplary embodiments of the present disclosure have been described in detail with reference to the accompanying drawings, the present disclosure is not limited thereto and may be embodied in many different forms without departing from the technical concept of the present disclosure. Therefore, the exemplary embodiments of the present disclosure are provided for illustrative purposes only but not intended to limit the technical concept of the present disclosure. The scope of the technical concept of the present disclosure is not limited thereto. Therefore, it should be understood that the above-described exemplary embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A pixel circuit, comprising:
- a driving transistor including a gate electrode, a first electrode, and a second electrode;
- a first transistor connected to the gate electrode and the second electrode;
- a second transistor connected to the first transistor and the gate electrode;
- a third transistor connected to the second electrode and the first transistor;
- a fourth transistor connected to the first electrode and a high potential power line;
- a fifth transistor connected to the first electrode and a data voltage line;
- a sixth transistor connected to the gate electrode and an initialization voltage line;
- a first capacitor connected to the gate electrode, the first transistor, the second transistor, and the high potential power line;
- a second capacitor connected to the high potential power line, the first capacitor, and the second transistor; and
- a light emitting diode connected to the third transistor and a low potential power line.

2. The pixel circuit according to claim 1, wherein the pixel circuit is connected to a gate driving circuit,
- wherein the first transistor, the second transistor, the fifth transistor, and the sixth transistor are controlled by a scan signal supplied from the gate driving circuit, and the third transistor and the fourth transistor are controlled by an emission signal supplied from the gate driving circuit.

3. The pixel circuit according to claim 2, further comprising:
- a seventh transistor connected to the first electrode and a first voltage line; and
- an eighth transistor connected to the light emitting diode and a second voltage line.

4. The pixel circuit according to claim 3, wherein the seventh transistor and the eighth transistor are controlled by a scan signal supplied through the gate driving circuit.

5. The pixel circuit according to claim 3, wherein an on-bias stress voltage is supplied to the seventh transistor through the first voltage line and a reset voltage is supplied to the eighth transistor through the second voltage line.

6. The pixel circuit according to claim 1, wherein at least one of the first transistor, the second transistor, or the sixth transistor includes an oxide semiconductor layer.

7. A pixel circuit, comprising:
- a driving transistor including a gate electrode, a first electrode, and a second electrode, the first electrode connected to a first node, the gate electrode connected to a second node, and the second electrode connected to a third node;
- a first transistor connected between the second node and the third node;
- a second transistor connected to the second node;
- a first capacitor connected between the second node and a high potential power line;
- a second capacitor connected between the high potential power line and the second transistor;
- a third transistor connected between the third node and a fourth node;
- a fourth transistor connected between the first node and the high potential power line;
- a fifth transistor connected between the first node and a data voltage line; and
- a sixth transistor connected between the second node and an initialization voltage line; and
- a light emitting diode connected between the fourth node and a low potential power line.

8. The pixel circuit according to claim 7, wherein the pixel circuit is connected to a gate driving circuit,
- wherein the first transistor, the second transistor, the fifth transistor, and the sixth transistor are controlled by a scan signal supplied from the gate driving circuit, and the third transistor and the fourth transistor are controlled by an emission signal supplied from the gate driving circuit.

9. The pixel circuit according to claim 8, further comprising:
- a seventh transistor connected between the first node and a first voltage line; and
- an eighth transistor connected between the fourth node and a second voltage line.

10. The pixel circuit according to claim 9, wherein the seventh transistor and the eighth transistor are controlled by a scan signal supplied through the gate driving circuit.

11. The pixel circuit according to claim 10, wherein an on-bias stress voltage is supplied to the seventh transistor through the first voltage line and a reset voltage is supplied to the eighth transistor through the second voltage line.

12. The pixel circuit according to claim 7, wherein at least one of the first transistor, the second transistor, or the sixth transistor includes an oxide semiconductor layer.

13. A display apparatus, comprising:
- a display panel including the pixel circuit according to claim 7;
- a gate driving circuit connected to the pixel circuit; and
- a data driving circuit connected to the pixel circuit.

* * * * *